United States Patent
Baumann et al.

(10) Patent No.: US 12,252,498 B2
(45) Date of Patent: Mar. 18, 2025

(54) ELECTROCHROMIC DEVICES HAVING A BUFFER SYSTEM

(71) Applicant: Gentex Corporation, Zeeland, MI (US)

(72) Inventors: Kelly Baumann, Zeeland, MI (US); Garret DeNolf, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 169 days.

(21) Appl. No.: 18/303,326

(22) Filed: Apr. 19, 2023

(65) Prior Publication Data
US 2023/0382938 A1 Nov. 30, 2023

Related U.S. Application Data

(60) Provisional application No. 63/415,537, filed on Oct. 12, 2022, provisional application No. 63/332,757, filed on Apr. 20, 2022.

(51) Int. Cl.
*C07F 17/02* (2006.01)
*C09K 9/02* (2006.01)
*G02F 1/1514* (2019.01)

(52) U.S. Cl.
CPC .............. *C07F 17/02* (2013.01); *C09K 9/02* (2013.01); *G02F 1/1514* (2019.01); *C09K 2211/1007* (2013.01); *C09K 2211/187* (2013.01); *G02F 2001/15145* (2019.01)

(58) Field of Classification Search
CPC ..... C07F 17/02; C09K 9/02; C09K 2211/187; C09K 2211/1007; G02F 1/1514; G02F 2001/15145
See application file for complete search history.

(56) References Cited

U.S. PATENT DOCUMENTS 6,193,912 B1    2/2001   Thieste et al.

OTHER PUBLICATIONS

Gyunhee Lee, Curt M. Wong, and Christo S. Sevov, Single vs Dual Shuttle Cycling of Polyferrocenyl Cathodes for Redox Targeting Flow Batteries, ACS Energy Letters 2022, 7 (10), 3337-3344 (Year: 2022).*
Abd-El-Aziz, A. S. et al., "Macromolecules containing redox-active neutral and cationic iron complexes", Macromolecules, 2005, vol. 38, pp. 9411-9419.
Ghazzy, A. et al., "Aryl ferrocenylmethylesters: Synthesis, solid-state structure and electrochemical investigations", Arabian journal of chemistry, 2020, vol. 13, pp. 3546-3557.
International Search Report and Written Opinion issued in connection with PCT Appl. No. PCT/US2023/019137 dated Aug. 7, 2023.
Locke, A. J. et al., "A rapid approach to ferrocenophanes via ring-closing metathesis", Journal of organometallic chemistry, 2001, vol. 637, pp. 669-676.
Sha, Y. et al., "Ring-closing metathesis and ring-opening metathesis polymerization toward main-chain ferrocene-containing polymers", Macromolecules, 2018, vol. 51, No. 22, pp. 9131-9139.
Taher, D. et al., "Ferrocenylmethyl-functionalized 5-membered heterocycles: Synthesis, solid-state structure and electrochemical investigations", Polyhedron, 2018, vol. 152, pp. 188-194.

* cited by examiner

*Primary Examiner* — Bijan Ahvazi
(74) *Attorney, Agent, or Firm* — Foley & Lardner LLP; Brian James Brewer

(57) ABSTRACT

A compound represented by the structure of Formula (I), or a salt thereof suitable for use as a buffer in an electrochromic device is disclosed.

18 Claims, 8 Drawing Sheets

ELECTROCHROMIC DEVICES HAVING A BUFFER SYSTEM

CROSS REFERENCE TO RELATED APPLICATIONS

This application claims the benefit of priority to U.S. Provisional Patent Application No. 63/415,537 filed Oct. 12, 2022, and U.S. Provisional Patent Application No. 63/332,757 filed Apr. 20, 2022, which are hereby incorporated by reference, in their entirety for any and all purposes.

FIELD

The present technology is generally related to buffers for use in electrochromic devices. More particularly, it is related to buffers that are suitable for use in electrochromic devices and prolong the thermal stability and/or UV stability of the electrochromic devices.

BACKGROUND

Electrochromic devices have been well known for many years. While the utilization of electrochromic devices, such as electrochromic mirrors, has become increasing popular among, for example, the automotive industry, the development of undesirable residual color within the electrochromic medium remains problematic.

Indeed, when a sufficient electrical potential difference is applied across the electrodes of a conventional device, the electrochromic medium becomes intentionally colored (i.e. a low transmission state) inasmuch as one or more of the anodic and the cathodic materials are oxidized and reduced, respectively. Specifically, the anodic materials are oxidized by donating electrons to the anode, and the cathodic materials are reduced by accepting electrons from the cathode.

For most commercially available devices, when the electrical potential difference is removed or substantially diminished, the anodic and cathodic materials return to their native or unactivated state, and in turn, return the electrochromic medium to its colorless or nearly colorless state (i.e. a high transmission state). The application and removal of an electrical potential difference is conventionally known as a single cycle of the electrochromic device.

Scientists have observed that over a period of cycles and/or time, during normal operation of the electrochromic device, the electrochromic medium sometimes does not remain colorless in the high transmission state. In some instances, even in the absence of an electrical potential difference, either one or both of a portion of the anodic and cathodic materials are oxidized or reduced respectively, thereby forming residual oxidized and/or reduced materials. The residual oxidized anodic materials and/or the residual reduced cathodic materials of the electrochromic medium can result in an undesired residual coloration of the electrochromic medium.

Factors that are believed to facilitate the formation of the undesired residual oxidized anodic and/or reduced cathodic materials include, among other things, impurities within the medium, thermal and/or photochemical decomposition of one or more of the medium materials, and/or the permeation of water and/or oxygen into the electrochromic medium.

This disclosure addresses the need for electrochromic devices that are able to maintain its colorless or nearly colorless state by using buffers that are suitable for use in electrochromic devices and prolong the thermal stability and/or UV stability of the electrochromic devices.

SUMMARY

Provided in one aspect is compound represented by the structure of Formula (I), or a salt thereof:

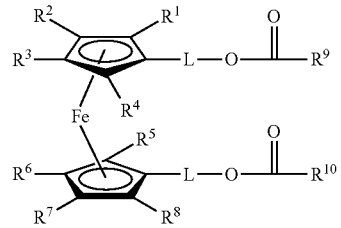

wherein:
$R^1$, $R^2$, $R^3$, $R^4$, $R^5$, $R^6$, $R^7$, and $R^8$ are each independently H or a substituted or unsubstituted $C_1$-$C_{10}$ alkyl group;
each L is independently a substituted or unsubstituted $C_1$-$C_{20}$ alkylene group; and
$R^9$ and $R^{10}$ are each independently substituted or unsubstituted $C_1$-$C_{20}$ alkyl group, substituted or unsubstituted $C_2$-$C_{20}$ alkenyl group, substituted or unsubstituted $C_2$-$C_{20}$ alkynyl group, substituted or unsubstituted $C_3$-$C_{10}$ cycloalkyl group, substituted or unsubstituted aryl group, and substituted or unsubstituted heteroaryl group.

In some embodiments, $R^1$, $R^2$, $R^3$, $R^4$, $R^5$, $R^6$, $R^7$, and $R^8$ are each independently H. In some embodiments, $R^1$, $R^2$, $R^3$, $R^4$, $R^5$, $R^6$, $R^7$, and $R^8$ are each independently substituted or unsubstituted $C_1$-$C_{10}$ alkyl group.

In some embodiments, $R^1$, $R^2$, $R^3$, $R^4$, $R^5$, $R^6$, $R^7$, and $R^8$ are each independently substituted or unsubstituted $C_1$-$C_8$ alkyl group, substituted or unsubstituted $C_1$-$C_6$ alkyl group, or substituted or unsubstituted $C_1$-$C_4$ alkyl group. In some embodiments, $R^1$, $R^2$, $R^3$, $R^4$, $R^5$, $R^6$, $R^7$, and $R^8$ are each independently methyl, ethyl, propyl, butyl, pentyl, hexyl, heptyl, octyl, nonyl, or decyl.

In some embodiments, each L is independently a substituted or unsubstituted $C_1$-$C_{20}$ alkylene group, substituted or unsubstituted $C_1$-$C_{15}$ alkylene group, substituted or unsubstituted $C_1$-$C_{12}$ alkylene group, substituted or unsubstituted $C_1$-$C_{10}$ alkylene group, substituted or unsubstituted $C_1$-$C_8$ alkylene group, substituted or unsubstituted $C_1$-$C_6$ alkylene group, or substituted or unsubstituted $C_1$-$C_4$ alkylene group. In some embodiments, each L is independently methylene, ethylene, propylene, butylene, pentylene, hexylene, heptylene, octylene, nonylene, or decylene.

In some embodiments, $R^9$ and $R^{10}$ are each independently substituted or unsubstituted $C_1$-$C_{20}$ alkyl group, substituted or unsubstituted $C_2$-$C_{20}$ alkenyl group, substituted or unsubstituted $C_2$-$C_{20}$ alkynyl group, or substituted or unsubstituted $C_3$-$C_{10}$ cycloalkyl group.

In some embodiments, $R^9$ and $R^{10}$ are each independently a substituted or unsubstituted $C_1$-$C_{20}$ alkyl group, substituted or unsubstituted $C_1$-$C_{15}$ alkyl group, substituted or unsubstituted $C_1$-$C_{12}$ alkyl group, substituted or unsubstituted $C_1$-$C_{10}$ alkyl group, substituted or unsubstituted $C_1$-$C_8$ alkyl group, substituted or unsubstituted $C_1$-$C_6$ alkyl group, or substituted or unsubstituted $C_1$-$C_4$ alkyl group. In some embodiments, $R^9$ and $R^{10}$ are each independently methyl, ethyl, propyl, isopropyl, butyl, isobutyl, sec-butyl, tertiary butyl, pentyl, neopentyl, hexyl, heptyl, octyl nonyl, or decylene.

In some embodiments, $R^9$ and $R^{10}$ are each independently a substituted or unsubstituted $C_2$-$C_{20}$ alkenyl group, substituted or unsubstituted $C_2$-$C_{15}$ alkenyl group, substituted or unsubstituted $C_2$-$C_{12}$ alkenyl group, substituted or unsubstituted $C_2$-$C_{10}$ alkenyl group, substituted or unsubstituted $C_2$-$C_8$ alkenyl group, substituted or unsubstituted $C_2$-$C_6$ alkenyl group, or substituted or unsubstituted $C_2$-$C_4$ alkenyl group.

In some embodiments, $R^9$ and $R^{10}$ are each independently a substituted or unsubstituted $C_2$-$C_{20}$ alkynyl group, substituted or unsubstituted $C_2$-$C_{15}$ alkynyl group, substituted or unsubstituted $C_2$-$C_{12}$ alkynyl group, substituted or unsubstituted $C_2$-$C_{10}$ alkynyl group, substituted or unsubstituted $C_2$-$C_8$ alkynyl group, substituted or unsubstituted $C_2$-$C_6$ alkynyl group, or substituted or unsubstituted $C_2$-$C_4$ alkynyl group.

In some embodiments, $R^9$ and $R^{10}$ are each independently a substituted or unsubstituted $C_3$-$C_8$ cycloalkyl group or substituted or unsubstituted $C_3$-$C_6$ cycloalkyl group.

In some embodiments, $R^9$ and $R^{10}$ are each independently substituted or unsubstituted aryl group, and substituted or unsubstituted heteroaryl group. In some embodiments, $R^9$ and $R^{10}$ are each independently substituted or unsubstituted aryl group. In some embodiments, $R^9$ and $R^{10}$ are each independently substituted or unsubstituted heteroaryl group.

In some embodiments, the compound is a ferrocenium salt with an anion comprising $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, wherein Ar is an aryl or fluorinated aryl group. In some embodiments, the anion is selected from $BF_4^-$.

In some embodiments, the compound is:

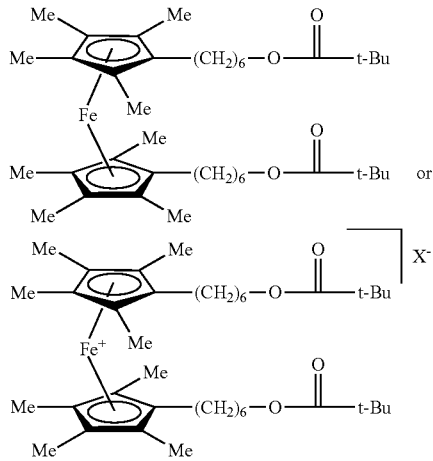

wherein $X^-$ is an anion.

In some embodiments, $X^-$ is $F^-$, $Cl^-$, $Br^-$, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, wherein Ar is an aryl or fluorinated aryl group.

Also provided in another aspect is an electrochromic device, comprising: (i) at least one solvent; (ii) a cathodic electroactive material; (iii) an anodic electroactive material; and (iv) a buffer comprising any one of the compounds disclosed herein.

In some embodiments, the at least one solvent comprises 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaro nitrile, ketones including 2-acetylbutyrolactone, cyclopentanone, cyclic esters including beta-propiolactone, gamma-butyrolactone, gamma-valerolactone, propylene carbonate, ethylene carbonate, and homogenous mixtures of the same.

In some embodiments, the concentration of at least one of the cathodic and anodic electrochromic materials ranges from about 1 mM to about 250 mM, from about 1 mM to about 200 mM, from about 1 mM to about 100 mM, from about 5 mM to about 250 mM, from about 5 mM to about 200 mM, or from about 5 mM to about 100 mM.

In some embodiments, the concentration of the buffer is from about 0.1 mM to about 200 mM, from about 0.1 mM to about 200 mM, from about 0.1 mM to about 100 mM, from about 0.1 mM to about 50 mM, from about 0.1 mM to about 30 mM, from about 0.1 mM to about 20 mM, from about 1 mM to about 200 mM, from about 1 mM to about 100 mM, from about 1 mM to about 50 mM, from about 1 mM to about 30 mM, or from about 1 mM to about 20 mM. In some embodiments, the concentration of the buffer is from 0.1 mM to about 30 mM or from about 1 mM to about 30 mM.

In some embodiments, the buffer prolongs the thermal stability of the electrochromic device. In some embodiments, the buffer prolongs the UV stability of the electrochromic device.

In some embodiments, the anodic electroactive material comprises a reduced form or an N-alkylated derivative of methylene blue. In some embodiments, the anodic electroactive material comprises a compound represented by the structure of Formula (II):

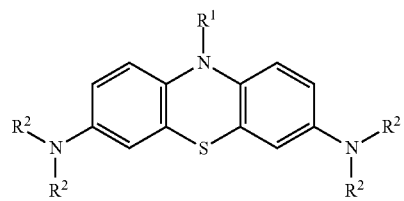

wherein:
$R^1$ is H or a substituted or unsubstituted $C_1$-$C_{20}$ alkyl group, and
each $R^2$ is independently a substituted or unsubstituted $C_1$-$C_{20}$ alkyl group.

In some embodiments, $R^1$ is H. In some embodiments, $R^1$ is a substituted or unsubstituted $C_1$-$C_{20}$ alkyl group, substituted or unsubstituted $C_1$-$C_{15}$ alkyl group, substituted or unsubstituted $C_1$-$C_{12}$ alkyl group, substituted or unsubstituted $C_1$-$C_{10}$ alkyl group, substituted or unsubstituted $C_1$-$C_8$ alkyl group, substituted or unsubstituted $C_1$-$C_6$ alkyl group, or substituted or unsubstituted $C_1$-$C_4$ alkyl group.

In some embodiments, $R^1$ is H, isobutyl, 2-methyl butyl, 2-ethyl butyl, 2-ethyl hexyl, sec-butyl, isopentyl, or neopentyl. In some embodiments, $R^1$ is H, isobutyl, 2-methylbutyl, 2-ethylbutyl, 2-ethylhexyl, or neopentyl.

In some embodiments, each $R^2$ is independently a substituted or unsubstituted $C_1$-$C_{10}$ alkyl group, substituted or unsubstituted $C_1$-$C_8$ alkyl group, substituted or unsubstituted $C_1$-$C_6$ alkyl group, substituted or unsubstituted $C_1$-$C_4$ alkyl group, or substituted or unsubstituted $C_1$-$C_2$ alkyl group. In some embodiments, each $R^2$ is independently methyl.

Also provided in another aspect is an electrochromic medium for use in an electrochromic device, the medium comprising: (i) at least one solvent; (ii) a cathodic electroactive material; (iii) an anodic electroactive material; and (iv) a buffer comprising any one of the compounds disclosed herein.

Also provided in another aspect is a process for preparing a compound represented by the structure of Formula (I):

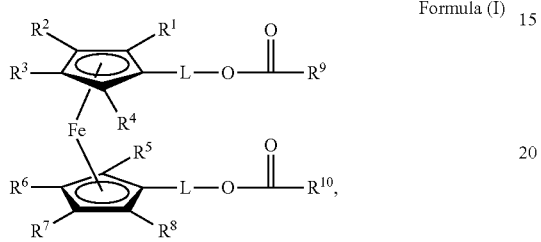

Formula (I)

the process comprising:
(i) contacting a compound represented by the structure of Formula (Ia):

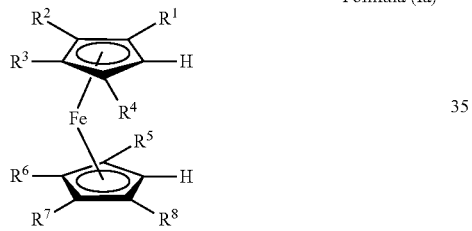

Formula (Ia)

with a compound having a structure of Formula (Ib):

Formula (Ib)

in the presence of zinc dichloride and a solvent to provide a compound having the structure of Formula (Ic):

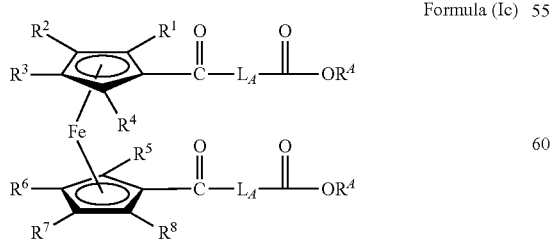

Formula (Ic)

(ii) contacting a compound represented by the structure of Formula (Ic):

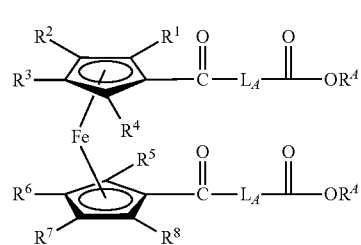

Formula (Ic)

in the presence of a borane complex and a solvent to provide a compound having the structure of Formula (Id):

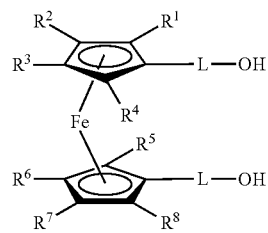

Formula (Id)

(iii) contacting a compound represented by the structure of Formula (Id):

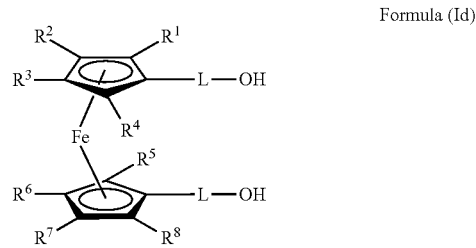

Formula (Id)

with a compound having a structure of Formula (Ie): $X'$—$C(O)R^B$, in the presence of a base and a solvent to provide a compound having the structure of Formula I:

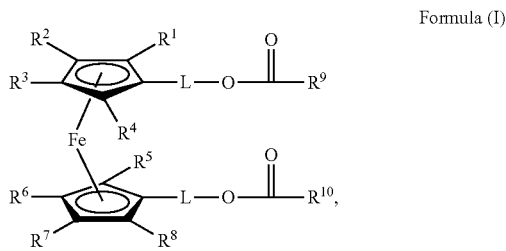

Formula (I)

wherein:
X' is a halide;
$R^A$ are each independently a substituted or unsubstituted $C_1$-$C_{10}$ alkyl group;
$R^1$, $R^2$, $R^3$, $R^4$, $R^5$, $R^6$, $R^7$, and $R^8$ are each independently H or a substituted or unsubstituted $C_1$-$C_{10}$ alkyl group;
each $L_A$ is independently a substituted or unsubstituted $C_1$-$C_{20}$ alkylene group;

each L is independently a substituted or unsubstituted $C_1$-$C_{20}$ alkylene group; and $R^9$ and $R^{10}$ are each independently substituted or unsubstituted $C_1$-$C_{20}$ alkyl group, substituted or unsubstituted $C_2$-$C_{20}$ alkenyl group, substituted or unsubstituted $C_2$-$C_{20}$ alkynyl group, substituted or unsubstituted $C_3$-$C_{10}$ cycloalkyl group, substituted or unsubstituted aryl group, and substituted or unsubstituted heteroaryl group; and wherein $R^B$ in Formula (Ie) corresponds to $R^9$ and $R^{10}$ in Formula (I).

In some embodiments, in step (i), the solvent comprises toluene. In some embodiments, in step (ii), the borane complex comprises $BH_3$/THF; and the solvent comprises toluene. In some embodiments, in step (iii), X' is a chloro group; the base comprises triethylamine; and the solvent comprises dichloroethane.

In some embodiments, the compound of Formula (I) is further contacted with a tetrafluoroboric acid complex and benzoquinone to form a ferrocinium compound based upon Formula (I).

DETAILED DESCRIPTION

Figure 1:
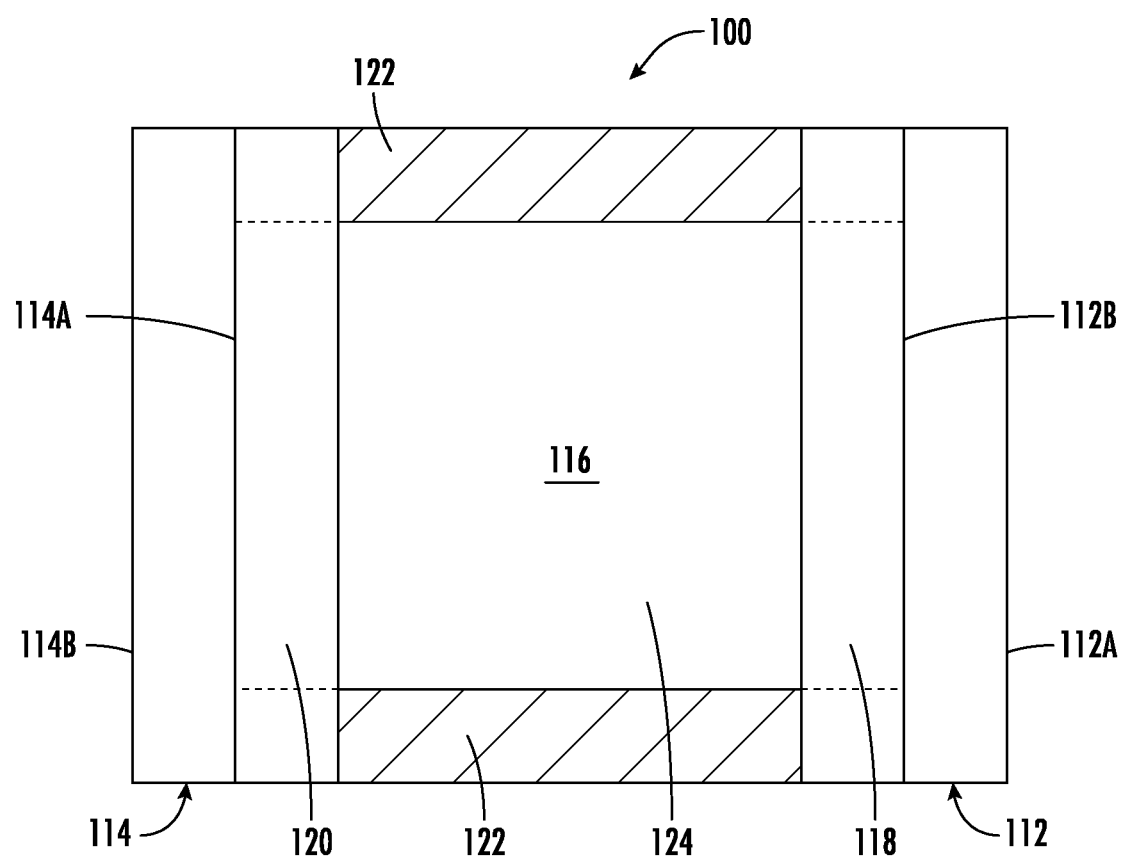
FIG. 1 is a cross-sectional schematic representation of an electrochromic device fabricated in accordance with the present invention.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. An alkyl group may be substituted one or more times. An alkyl group may be substituted two or more times. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, isopentyl groups, and 1-cyclopentyl-4-methylpentyl. Representative substituted alkyl groups may be substituted one or more times with, for example, amino, ammonium, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

Alkynyl groups are straight chain, branched or cyclic alkyl groups having 2 to about 20 carbon atoms, and further including at least one triple bond. In some embodiments alkynyl groups have from 1 to 12 carbons, or, typically, from 1 to 8 carbon atoms. Alkynyl groups may be substituted or unsubstituted. Alkynyl groups may be substituted similarly to alkyl groups. Divalent alkynyl groups, i.e., alkynyl groups with two points of attachment.

As used herein, "aryl", or "aromatic," groups are cyclic aromatic hydrocarbons that do not contain heteroatoms. Aryl groups include monocyclic, bicyclic, and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. An aryl group with one or more alkyl groups may also be referred to as alkaryl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Heterocyclyl or heterocycle refers to both aromatic and nonaromatic ring compounds including monocyclic, bicyclic, and polycyclic ring compounds containing 3 or more ring members of which one or more is a heteroatom such as, but not limited to, N, O, and S. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 oxygen atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more O atoms, pyrrolyl, pyridinyl homopiperazinyl, oxazolidin-2-onyl, pyrrolidin-2-onyl, oxazolyl, quinuclidinyl, thiazolyl, isoxazolyl, furanyl, dibenzylfuranyl, and tetrahydrofuranyl. Heterocyclyl or heterocycles may be substituted.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, dibenzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

As used herein, the prefix "halo" refers to a halogen (i.e. F, Cl, Br, or I) being attached to the group being modified by the "halo" prefix. For example, haloaryls are halogenated aryl groups.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth.

The present disclosure relates to electrochromic devices and mediums that incorporate specific ferrocene compounds (e.g., the compounds of Formula (I), wherein these ferrocene compounds exhibit greater solubility in the solution phase when used as buffers. Using these specific ferrocene compounds prolong the thermal stability and/or the UV stability of the electrochromic device. These specific ferrocene compounds may also be used to change the color of the electrochromic devices. As demonstrated in the Examples, the ferrocene compounds described herein may be used in electrochromic devices that are suitable for use as near IR filters. Contemplated near IR filters include those that absorb within the range of from about 900 to about 1000 nm, in particular absorb at about 940 nm.

Also provided in another aspect is an electrochromic device, comprising: (i) at least one solvent; (ii) a cathodic electroactive material; (iii) an anodic electroactive material; and (iv) a buffer comprising any one of the compounds disclosed herein. In some embodiments, the cathodic electroactive material and the buffer comprising any one of the compounds disclosed herein are the same compound.

Also provided in another aspect is an electrochromic medium for use in an electrochromic device, the medium comprising: (i) at least one solvent; (ii) a cathodic electroactive material; (iii) an anodic electroactive material; and (iv) a buffer comprising any one of the compounds disclosed herein. In some embodiments, the cathodic electroactive material and the buffer comprising any one of the compounds disclosed herein are the same compound.

FIG. 1 shows a cross-sectional schematic representation of electrochromic device 100 is shown, which generally comprises first substrate 112 having a front surface 112A and a rear surface 112B, second substrate 114 having a front surface 114.A and a rear surface 114B, and chamber 116 for containing electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector," (hereinafter the '625 patent) which is hereby incorporated herein by reference in its entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins or plastics including Topas,® which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties which will enable them to operate effectively in conditions of intended use. Indeed, electrochromic devices in accordance with the present invention can be, during normal operation, exposed to extreme temperatures as well as exposed to substantial ultraviolet radiation, emanating primarily—from the sun.

Second substrate 114 can be fabricated from similar materials as that of first substrate 112. However, if the electrochromic device is a mirror, then the requisite of substantial transparency is not necessary. As such, second substrate 114 may, alternatively, comprise polymers, metals, glass, ceramics, or other similar materials. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered or strengthened by thermal or chemical means prior to or subsequent to being coated with layers of electrically conductive material (118 and 120).

One or more layers of electrically conductive material 118 are associated with rear surface 112B of the first substrate. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium doped tin oxide (ITO), doped zinc oxide or other materials known in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define the inner peripheral geometry of chamber 116.

Electrically conductive material 120 may vary depending upon the intended use of the electrochromic device. For example, if the electrochromic device is a mirror, then the material may comprise a transparent conductive coating similar to electrically conductive material 118 (in which case a reflector is associated with rear surface 114B of second substrate 114). Alternatively, electrically conductive material 120 may comprise a layer of reflective material in accordance with the teachings of the above-referenced '625 patent. In this case, electrically conductive material 120 is associated with front surface 114A of second substrate 114. Typical coatings for this type of reflector include chromium, rhodium, ruthenium, silver, silver alloys, and stacked layers thereof.

Sealing member 122 may comprise any material that is capable of being adhesively bonded to the electrically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. Nos. 4,297,401, 4,418,102, 4,695,490, 5,596,023, 5,596,024, 4,297,401, and U.S. patent application Ser. No. 09/158,423 entitled "Improved Seal For Electrochromic Devices," all of which are herein incorporated by reference.

Electrochromic medium 124 is shown in FIG. 1, which generally comprises an anodic electroactive and/or electrochromic material, a cathodic electroactive and/or electrochromic material, at least one solvent, and a buffer comprising any one of the compounds described herein. The electrochromic medium 124 may be configured any one of a number of different ways, including the configurations disclosed in U.S. Pat. No. 6,020,987 entitled "Improved Electrochromic System for Producing a Preselected Color." The term "electrochromic" will be defined herein, regardless of its ordinary meaning, as a material that has a change in its extinction coefficient at one or more wavelengths upon exposure to a particular electrical potential difference. The term "electroactive" will be defined herein, regardless of its ordinary meaning, as a material that undergoes a modification in its oxidation state upon exposure to a particular electrical potential difference.

The electroactive and/or electrochromic materials disclosed in the present disclosure may be combined or linked by a bridging unit in accordance with the teachings of International application Ser. No. PCT/EP97/00499 entitled "Electrochromic System."

The electroactive and/or electrochromic materials disclosed in the present disclosure may also be "tied" into a gelatinous media in accordance with the teachings of U.S. Pat. No. 5,910,854 entitled "Electrochromic Polymeric Solid Films, Manufacturing Electrochromic Devices Using Such Solid Films, And Processes For Making Such Solid Films and Devices," which is incorporated herein by reference. In addition, a hybrid medium is likewise contemplated for use. In a hybrid medium, one of the cathodic or anodic materials can be applied (in a solid form) to its respective electrically conductive or semi-conductive material. For example, tungsten oxide ($WO_3$) or polyaniline can be applied onto the surface of a conventional electrically conductive material. Additionally, numerous viologens can be applied onto, among other materials, $TiO_2$.

Cathodic electroactive/electrochromic materials may include, for example, bipyridinyl based viologens, such as methylviologen tetrafluoroborate or octylviologen tetrafluoroborate as well as polymeric viologens. Also metalloceniums, substituted metalloceniums, ferroceniums, substituted ferroceniums and substituted ferrocenium salts are contemplated. It will be understood that the preparation or commercial availability of the above-identified materials is well known in the art. While specific cathodic materials have been provided, for illustrative purposes only, numerous other conventional cathodic materials are likewise contemplated for use including, but by no means limited to, those disclosed in U.S. Pat. No. 4,902,108 and U.S. application Ser. No. 09/366,115 entitled "Electrochromic Materials with Enhanced Ultraviolet Stability" which are hereby incorporated in their entirety herein by reference. Indeed, the only contemplated limitation relative to the cathodic material is that it should not adversely affect the electrochromic performance of device 100. Moreover, it is contemplated that the cathodic material may comprise a solid transition metal oxide, including, but not limited to, tungsten oxide.

The anodic electroactive and/or cathodic electrochromic material may comprise any one of a number of materials including a metallocene, substituted metallocenes, ferrocene, substituted ferrocenes, substituted ferrocenyl salts, azines, phenazine, substituted phenazines, phenothiazine, substituted phenothiazines, triphenoazines, triphenodithiazines, triphenodioxazines, quinoxalinophenazines, carbazoles, and phenylenediamines. Examples of anodic materials may include di-tert-butyl-diethylferrocene, (6-(tetra-tert-butylferrocenyl)hexyl)triethylammonium tetrafluoroborate, (3-(tetra-tert-butylferrocenyl)propyl)triethylammonium tetrafluoroborate, 5,10-dimethylphenazine, and 3,7, 10-trimethylphenothiazine. In some embodiments, anodic electroactive and/or cathodic electrochromic material may comprise any one of the compounds disclosed herein.

For illustrative purposes only, the concentration of the anodic and cathodic electroactive materials can range from approximately 1 millimolar (mM) to approximately 250 mM. In some embodiments, the concentration of at least one of the cathodic and anodic electrochromic materials ranges from about 1 mM to about 250 mM, from about 1 mM to about 200 mM, from about 1 mM to about 100 mM, from about 5 mM to about 250 mM, from about 5 mM to about 200 mM, or from about 5 mM to about 100 mM. In some embodiments, the concentration of at least one of the cathodic and anodic electrochromic materials ranges from about 5 mM to about 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, the solvent of the electrochromic medium may comprise one or more of any one of a number of common, commercially available materials including 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, carbonates including propylene carbonate, ethylene carbonate, and homogenous mixtures of the same. While specific solvents have been disclosed, for illustrative purposes only, as being associated with the electrochromic medium, numerous other solvents that would be known to those having ordinary skill in the art having the present disclosure before them are likewise contemplated for use. Indeed, it will be understood that non-liquid or polymer type electrochromic media are also suitable.

In some embodiments, the at least one solvent comprises 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate, and homogenous mixtures of the same.

In some embodiments, the concentration of the buffer is from about 0.1 mM to about 200 mM, from about 0.1 mM to about 200 mM, from about 0.1 mM to about 100 mM, from about 0.1 mM to about 50 mM, from about 0.1 mM to about 30 mM, from about 0.1 mM to about 20 mM, from about 1 mM to about 200 mM, from about 1 mM to about 100 mM, from about 1 mM to about 50 mM, from about 1 mM to about 30 mM, or from about 1 mM to about 20 mM. In some embodiments, the concentration of the buffer is from 0.1 mM to about 30 mM or from about 1 mM to about 30 mM.

In some embodiments, the buffer prolongs the thermal stability of the electrochromic device. In some embodiments, the buffer prolongs the UV stability of the electrochromic device.

Provided in one aspect is a buffer comprising a compound represented by the structure of Formula (I), or a salt thereof:

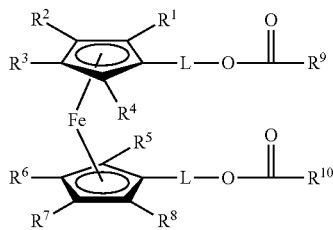

wherein:
$R^1$, $R^2$, $R^3$, $R^4$, $R^5$, $R^6$, $R^7$, and $R^8$ are each independently H or a substituted or unsubstituted $C_1$-$C_{10}$ alkyl group;
each L is independently a substituted or unsubstituted $C_1$-$C_{20}$ alkylene group; and
$R^9$ and $R^{10}$ are each independently substituted or unsubstituted $C_1$-$C_{20}$ alkyl group, substituted or unsubstituted $C_2$-$C_{20}$ alkenyl group, substituted or unsubstituted $C_2$-$C_{20}$ alkynyl group, substituted or unsubstituted $C_3$-$C_{10}$ cycloalkyl group, substituted or unsubstituted aryl group, and substituted or unsubstituted heteroaryl group.

In some embodiments, $R^1$, $R^2$, $R^3$, $R^4$, $R^5$, $R^6$, $R^7$, and $R^8$ are each independently H. In some embodiments, $R^1$, $R^2$, $R^3$, $R^4$, $R^5$, $R^6$, $R^7$, and $R^8$ are each independently substituted or unsubstituted $C_1$-$C_{10}$ alkyl group.

In some embodiments, $R^1$, $R^2$, $R^3$, $R^4$, $R^5$, $R^6$, $R^7$, and $R^8$ are each independently substituted or unsubstituted $C_1$-$C_8$ alkyl group, substituted or unsubstituted $C_1$-$C_6$ alkyl group, or substituted or unsubstituted $C_1$-$C_4$ alkyl group. In some embodiments, $R^1$, $R^2$, $R^3$, $R^4$, $R^5$, $R^6$, $R^7$, and $R^8$ are each independently methyl, ethyl, propyl, butyl, pentyl, hexyl, heptyl, octyl, nonyl, or decyl.

In some embodiments, each L is independently a substituted or unsubstituted $C_1$-$C_{20}$ alkylene group, substituted or unsubstituted $C_1$-$C_{15}$ alkylene group, substituted or unsubstituted $C_1$-$C_{12}$ alkylene group, substituted or unsubstituted $C_1$-$C_{10}$ alkylene group, substituted or unsubstituted $C_1$-$C_8$ alkylene group, substituted or unsubstituted $C_1$-$C_6$ alkylene group, or substituted or unsubstituted $C_1$-$C_4$ alkylene group. In some embodiments, each L is independently methylene, ethylene, propylene, butylene, pentylene, hexylene, heptylene, octylene, nonylene, or decylene.

In some embodiments, $R^9$ and $R^{10}$ are each independently substituted or unsubstituted $C_1$-$C_{20}$ alkyl group, substituted or unsubstituted $C_2$-$C_{20}$ alkenyl group, substituted or unsubstituted $C_2$-$C_{20}$ alkynyl group, or substituted or unsubstituted $C_3$-$C_{10}$ cycloalkyl group.

In some embodiments, $R^9$ and $R^{10}$ are each independently a substituted or unsubstituted $C_1$-$C_{20}$ alkyl group, substituted or unsubstituted $C_1$-$C_{15}$ alkyl group, substituted or unsubstituted $C_1$-$C_{12}$ alkyl group, substituted or unsubstituted $C_1$-$C_{10}$ alkyl group, substituted or unsubstituted $C_1$-$C_8$ alkyl group, substituted or unsubstituted $C_1$-$C_6$ alkyl group, or substituted or unsubstituted $C_1$-$C_4$ alkyl group. In some embodiments, $R^9$ and $R^{10}$ are each independently methyl, ethyl, propyl, isopropyl, butyl, isobutyl, sec-butyl, tertiary butyl, pentyl, neopentyl, hexyl, heptyl, octyl nonyl, or decylene.

In some embodiments, $R^9$ and $R^{10}$ are each independently a substituted or unsubstituted $C_2$-$C_{20}$ alkenyl group, substituted or unsubstituted $C_2$-$C_{15}$ alkenyl group, substituted or unsubstituted $C_2$-$C_{12}$ alkenyl group, substituted or unsubstituted $C_2$-$C_{10}$ alkenyl group, substituted or unsubstituted $C_2$-$C_8$ alkenyl group, substituted or unsubstituted $C_2$-$C_6$ alkenyl group, or substituted or unsubstituted $C_2$-$C_4$ alkenyl group.

In some embodiments, $R^9$ and $R^{10}$ are each independently a substituted or unsubstituted $C_2$-$C_{20}$ alkynyl group, substituted or unsubstituted $C_2$-$C_{15}$ alkynyl group, substituted or unsubstituted $C_2$-$C_{12}$ alkynyl group, substituted or unsubstituted $C_2$-$C_{10}$ alkynyl group, substituted or unsubstituted $C_2$-$C_8$ alkynyl group, substituted or unsubstituted $C_2$-$C_6$ alkynyl group, or substituted or unsubstituted $C_2$-$C_4$ alkynyl group.

In some embodiments, $R^9$ and $R^{10}$ are each independently a substituted or unsubstituted $C_3$-$C_8$ cycloalkyl group or substituted or unsubstituted $C_3$-$C_6$ cycloalkyl group.

In some embodiments, $R^9$ and $R^{10}$ are each independently substituted or unsubstituted aryl group, and substituted or unsubstituted heteroaryl group. In some embodiments, $R^9$ and $R^{10}$ are each independently substituted or unsubstituted aryl group. In some embodiments, $R^9$ and $R^{10}$ are each independently substituted or unsubstituted heteroaryl group.

In some embodiments, the compound is a ferrocenium salt with an anion comprising $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, wherein Ar is an aryl or fluorinated aryl group. In some embodiments, the anion is selected from $BF_4^-$.

In some embodiments, the compound is:

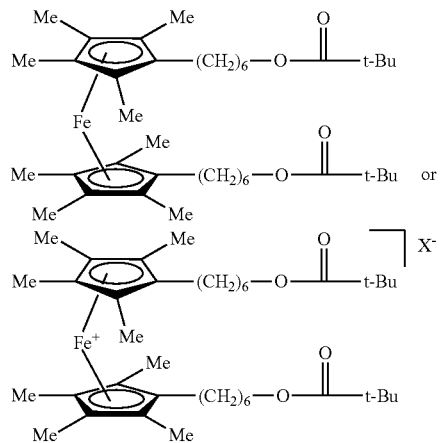

wherein $X^-$ is an anion.

In some embodiments, X⁻ is F⁻, Cl⁻, Br⁻, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, wherein Ar is an aryl or fluorinated aryl group.

In some embodiments, a compound represented by the structure of Formula (I) in the electrochromic devices described herein allows for the use of specific dyes, such as a reduced form or an N-alkylated derivative of methylene blue, as the anodic electroactive material to provide near IR filtering devices that are stable and absorb strongly in the near IR and very little in the visible range of light. Accordingly, in some embodiments, the anodic electroactive material comprises a reduced form or an N-alkylated derivative of methylene blue. In some embodiments, anodic electroactive material comprises a compound represented by the structure of Formula (II) as described herein.

In some embodiments, the anodic electroactive material comprises a compound represented by the structure of Formula (II):

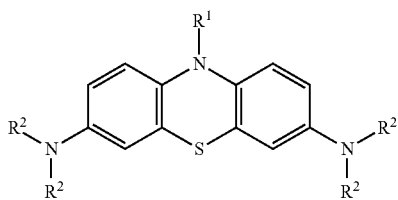

wherein:
$R^1$ is H or a substituted or unsubstituted $C_1$-$C_{20}$ alkyl group, and each $R^2$ is independently a substituted or unsubstituted $C_1$-$C_{20}$ alkyl group.

In some embodiments, $R^1$ is H. In some embodiments, $R^1$ is a substituted or unsubstituted $C_1$-$C_{20}$ alkyl group, substituted or unsubstituted $C_1$-$C_{15}$ alkyl group, substituted or unsubstituted $C_1$-$C_{12}$ alkyl group, substituted or unsubstituted $C_1$-$C_{10}$ alkyl group, substituted or unsubstituted $C_1$-$C_8$ alkyl group, substituted or unsubstituted $C_1$-$C_6$ alkyl group, or substituted or unsubstituted $C_1$-$C_4$ alkyl group.

In some embodiments, each $R^2$ is independently a substituted or unsubstituted $C_1$-$C_{10}$ alkyl group, substituted or unsubstituted $C_1$-$C_8$ alkyl group, substituted or unsubstituted $C_1$-$C_6$ alkyl group, substituted or unsubstituted $C_1$-$C_4$ alkyl group, or substituted or unsubstituted $C_1$-$C_2$ alkyl group. In some embodiments, each $R^2$ is independently methyl.

In some embodiments, $R^1$ is H, isobutyl, 2-methyl butyl, 2-ethyl butyl, 2-ethyl hexyl, sec-butyl, isopentyl, or neopentyl. In some embodiments, $R^1$ is H, isobutyl, 2-methylbutyl, 2-ethylbutyl, 2-ethylhexyl, or neopentyl.

Substituted alkyl groups, such as isobutyl, 2-methylbutyl, 2-ethylbutyl, 2-ethylhexyl, or neopentyl, are preferred substituents for $R^1$ as these groups do not have any hydrogens or only have one hydrogen at the β carbon position. Even 2-substituted vinyl groups may be suitable substituents for $R^1$ as these groups only one have hydrogen on the β carbon. Without wishing to be bound by theory, limiting the number of hydrogens present at the β carbon for $R^1$ is believed to prevent degradation processes stemming from an Hoffman elimination.

Compounds of Formula (II) having one hydrogen on the β carbon (e.g., $R^1$=isobutyl) may be prepared in a similar manner as shown in the below scheme.

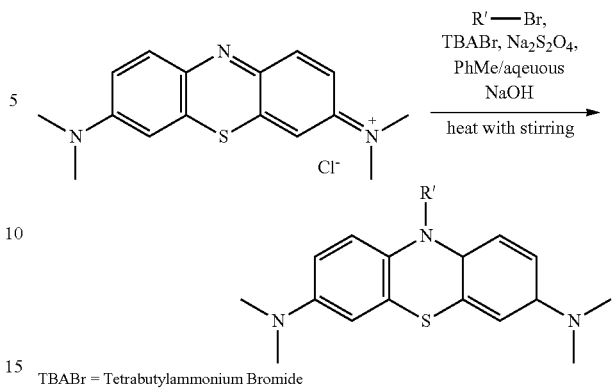

TBABr = Tetrabutylammonium Bromide

The N-alkylated derivatives of methylene blue may be prepared in a phase transfer reaction in toluene and aqueous sodium hydroxide. Methylene blue, tetrabutyl ammonium bromide as the catalyst, the alkylating reagent (e.g. isobutyl bromide, R'=isobutyl), and sodium hydrosulfite (which provides the two electrons/molecule to reduce to leuco form of dye) are added to a reaction flask. The reaction mixture may then be heated to a suitable temperature (such as 80° C.) with stirring for at least one week. The reaction product is extracted into the toluene layer and the salts are washed out. The reaction product may be crystallized and further recrystallized if needed from ethanol to obtain >99% pure product.

Compounds of Formula (II) having no hydrogens on the β carbon (e.g., R"=t-butyl) may be prepared in a similar manner as shown in the below scheme.

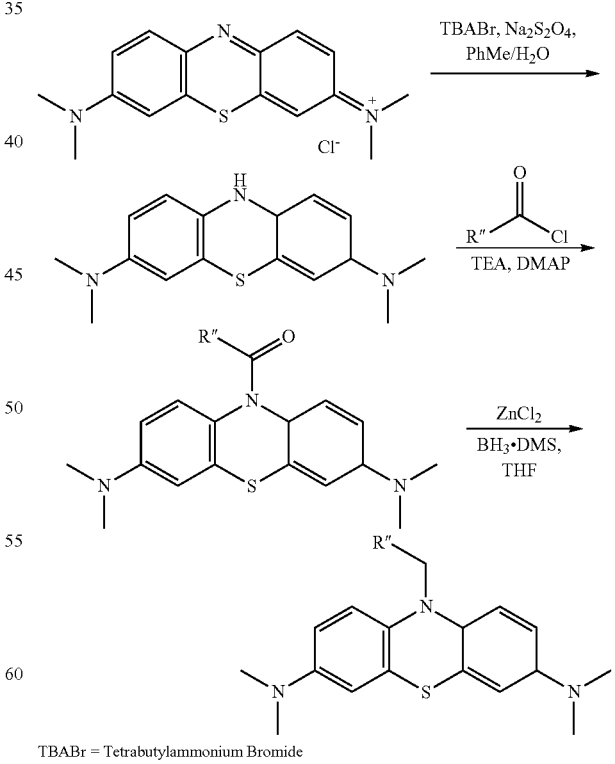

TBABr = Tetrabutylammonium Bromide

Methylene blue may be reduced in a phase transfer reaction in toluene and water with tetrabutyl ammonium bromide as the catalyst and sodium hydrosulfide (which provides the two electrons/molecule to reduce to leuco form of dye). The leucomethylene blue product is then extracted into the toluene layer, the salts are washed out, and the leucomethylene blue is azeotroped to dry. To the leucomethylene blue is added triethylamine (TEA), dimethylaminopyridine (DMAP), and trimethyl acetyl chloride (R"=t-butyl) to provide an amide derivative of methylene blue. Following an aqueous workup to remove excess acid chloride, the amide derivative is azeotroped to dryness. Then the amide derivative is reduced to the amine using $ZnCl_2$ and borane dimethylsulfide. The amine product is then concentrated to dryness and may be recrystallized from ethanol to obtain >99% pure product.

In addition to the reduced forms of methylene blue and the N-alkylated derivatives of methylene blue, suitable alternatives include and not are limited to other water soluble di alkyl amine dyes, such as Meldola Blue, Basic Blue 3, Methylene Violet 3RAX and Methylene Violet Bernthsen. These dyes may be used to prepare the near IR filters described herein that absorb at near IR wavelengths.

In addition, the electrochromic medium may also comprise one or more of light absorbers and/or blockers, light stabilizers, thermal stabilizers, antioxidants, viscosity modifiers including thickeners, and/or tint providing agents, and mixtures thereof. Suitable light stabilizers may include: the material ethyl-2-cyano-3,3-diphenyl acrylate, sold by BASF of Parsippany, N.Y. under the trademark Uvinul N-35 and by Aceto Corp., of Flushing, N.Y. under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few. Thickeners include polymethylmethacrylate (PMMA) and polycarbonate both of which are commercially available from, among other chemical suppliers, Aldrich Chemical Co. Moreover, the stability of the electrochromic medium can be enhanced in accordance with the teaching of U.S. application Ser. No. 09/377,455 entitled "Color Stabilized Electrochromic Devices" which is incorporated herein by reference.

The electrochromic media of the present disclosure utilize many different electroactive and/or electrochromic materials. The preparation and/or commercially available sources are provided herein, unless the material or its associated derivative is well known in the art. It will be understood that, unless specified otherwise, the starting reagents are commercially available from Aldrich Chemical Co., Milwaukee, Wis. and other common chemical suppliers. It will be further understood that conventional chemical abbreviations will be used when appropriate including the following: grams (g); milliliters (ml); moles (mol); millimoles (mmol); molar (M); millimolar (mM); pounds per square inch (psi); and hours (h).

Electrochromic devices described herein may be used in a wide variety of applications wherein, under normal operation, the transmitted or reflected light can be modulated—the skill of which is well known in the art. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

In some embodiments, electrochromic devices described herein may be used for color adjustment, wherein the buffer comprising any one of the compounds disclosed herein are used to remove some green color from phenazine cation radical or some blue color from viologen cation radical by adding a ferrocenium-based buffer as described herein. In some embodiments, the cathodic electroactive material comprises a viologen that leads to the formation of a residual reduced cathodic material while the electrochromic medium is in a high transmission state, and the buffer maintains a nearly colorless electrochromic medium.

In some embodiments, the electrochromic devices described herein may be designed to have a specific color. Illustrative examples include electrochromic devices with the soluble ferrocene, such as any one of the compounds disclosed herein, as the only anodic and some EC cathodic, preferably a viologen, where almost all the color comes from the viologen cation radical. Another example includes a device where the ferrocenium, such as any one of the compounds disclosed herein. is the only cathodic and all the color comes from the anodic cation radical (e.g. phenazine (mainly), triphenodithiazine, tripheno dioxazine, phenothiazine, phenoxazine, carbazole, and quinoxalino phenazine. In some embodiments, the cathodic electroactive material comprises a viologen that provides the color of the electrochromic medium, and the buffer is colorless.

In some embodiments, the electrochromic devices described herein may be used to make near IR filters. An illustrative example is demonstrated in Example 2, wherein the device comprises soluble ferrocenium, such as one of the compounds disclosed herein as a buffer, and an anodic, Whose cation radical absorbs in the near IR and has very little absorption in the visible. Since is important to have little to no visible light absorption, soluble ferrocenium, such as any one of the compounds disclosed herein, is ideal for this application. Example 2 demonstrates that an illustrative example of such devices and the results a the durability testing show that such devices have promising properties that make these devices ideal for use as near IR filters. In some embodiments, the electrochromic device absorbs near IR light; and the anodic electroactive material comprises a near absorbing anodic synthesized from a dye. Examples of such anodics include those disclosed in U.S. Pat. No. 6,193,912, which is incorporated by reference for the disclosure of such compounds.

Also provided in another aspect is a process for preparing a compound represented by the structure of Formula (I):

Formula (I)

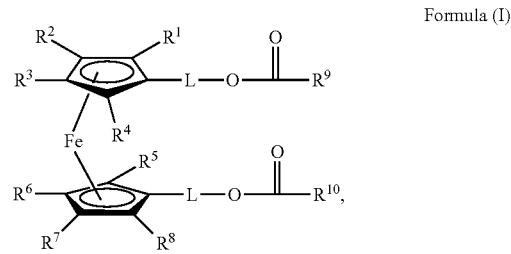

the process comprising:
(i) contacting a compound represented by the structure of Formula (Ia):

Formula (Ia)

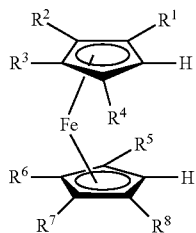

with a compound having a structure of Formula (Ib):

Formula (Ib)

in the presence of zinc dichloride and a solvent to provide a compound having the structure of Formula (Ic):

Formula (Ic)

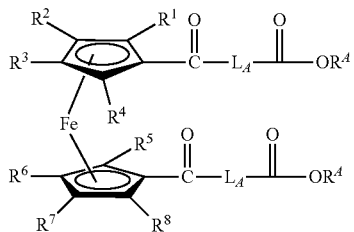

(ii) contacting a compound represented by the structure of Formula (Ic):

Formula (Ic)

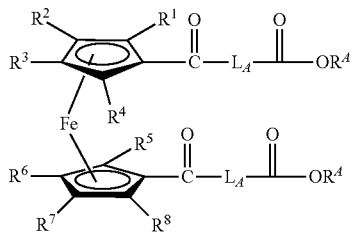

in the presence of a borane complex and a solvent to provide a compound having the structure of Formula (Id):

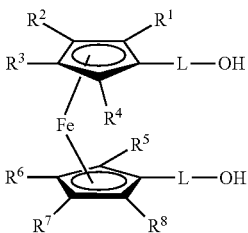

(iii) contacting a compound represented by the structure of Formula (Id):

Formula (Id)

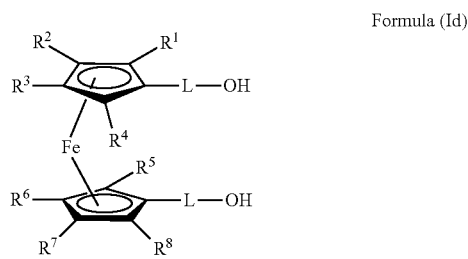

with a compound having a structure of Formula (Ie): $X^1$—$C(O)R^B$, in the presence of a base and a solvent to provide a compound having the structure of Formula I:

Formula (I)

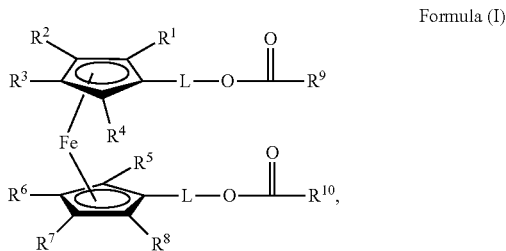

wherein:
  $X^1$ is a halide;
  $R^A$ are each independently a substituted or unsubstituted $C_1$-$C_{10}$ alkyl group;
  $R^1$, $R^2$, $R^3$, $R^4$, $R^5$, $R^6$, $R^7$, and $R^8$ are each independently H or a substituted or unsubstituted $C_1$-$C_{10}$ alkyl group;
  each $L_A$ is independently a substituted or unsubstituted $C_1$-$C_{20}$ alkylene group;
  each L is independently a substituted or unsubstituted $C_1$-$C_{20}$ alkylene group; and
  $R^9$ and $R^{10}$ are each independently substituted or unsubstituted $C_1$-$C_{20}$ alkyl group, substituted or unsubstituted $C_2$-$C_{20}$ alkenyl group, substituted or unsubstituted $C_2$-$C_{20}$ alkynyl group, substituted or unsubstituted $C_3$-$C_{10}$ cycloalkyl group, substituted or unsubstituted aryl group, and substituted or unsubstituted heteroaryl group; and
  wherein $R^B$ in Formula (Ie) corresponds to $R^9$ and $R^{10}$ in Formula (I).

In some embodiments, in step (i), the solvent comprises toluene. In some embodiments, in step (ii), the borane complex comprises $BH_3$/THF; and the solvent comprises toluene. In some embodiments, in step (iii), X' is a chloro group; the base comprises triethylamine; and the solvent comprises dichloroethane.

In some embodiments, the compound of Formula (I) is further contacted with a tetrafluoroboric acid complex and benzoquinone to form a ferrocinium compound based upon Formula (I).

The above process features a Friedel-Crafts acylation that has mild reaction conditions and provides the product in a quantitative yield. An alternative method for preparing a compound represented by the structure of Formula (I) is by using a Friedel-Craft acylation with the octamethyl ferrocene (or other alkylated ferrocene with at least one C—H position on a cyclopentadienyl ring), an acid chloride instead of the an anhydride (such as a compound of Formula (Ib)), and $AlCl_3$ as the catalyst (instead of zinc dichloride). However, a major limitation of this alternative method is that using the acid chloride with $AlCl_3$ results in significant oxidation of the octamethyl ferrocene. Such oxidation is not observed with the Friedel-Crafts acylation (e.g., in step (i)) as described herein.

The present invention, thus generally described, will be understood more readily by reference to the following examples, which are provided by way of illustration and are not intended to be limiting of the present invention.

EXAMPLES

In discussing colors it is useful to refer to the Commission Internationale de l'Eclairage's (CIE) 1976 CIELAB Chromaticity Diagram (commonly referred to the L*a*b* chart). The technology of color is relatively complex, but a fairly comprehensive discussion is given by F. W. Billmeyer and M. Saltzman in Principles of Color Technology, 2nd Ed., J. Wiley and Sons Inc. (1981), and the present disclosure, as it relates to color technology and terminology generally follows that discussion. On the L*a*b* chart, L* defines lightness, a* denotes the red/green value and b* denotes the yellow/blue value. Each of the electrochromic media has an absorption spectra at each particular voltage that may be converted into a three number designation, their L*a*b* values. Color change is calculated by importing L*a*b* values into the following formula:

$$\Delta E = \text{SQRT}((L_t^* - L_0^*)^2 + (a_t^* - a_0^*)^2 + (b_t^* - b_0^*)^2)$$

wherein

ΔE is the color change;
SQRT is the square root operation;
Subscript "0" is an initial value (for L*, a*, or b*); and
Subscript "t" is a value after a given amount of time (for L*, a*, or b*).

Example 1. Synthesis of Octa Methyl Bis(Hexano Pivalate Ester) Ferrocene and Ferrocinium A 50 L reaction vessel with nitrogen purge was charged 3.327 g of $FeCl_3$ and 18.5 L of hexane. The reaction vessel was stirred and cooled to 5° C. 18.5 L of dry THF was slowly added while keeping the reaction temperature below 40° C. 1.144 g of Fe(0) powder was slowly added, and the reaction vessel was heated to 55° C. overnight.

In a separate 50 L reactor, 5.00 kg of tetramethyl cyclopentadiene and 71.8 L of hexane were added, and the reactor was cooled to 5° C. 25.6 L of 1.6 M n-BuLi in air-tight fashion was slowly added over at least 1 hour while keeping the reaction temperature below 20° C. The reactor was allowed to stir at 20° C. overnight.

The next day, $FeCl_2$ slurry was cooled to 25° C. and the $FeCl_2$ slurry was added to the lithio tetra methyl Cp slurry with a slight vacuum on the latter. In particular, the addition was performed slowly to minimize the exotherm to below 30° C. The $FeCl_2$ reactor was rinsed with 18.5 L of dry THF and added to the tetramethyl Cp reactor. The reactor containing both the tetramethyl Cp and $FeCl_2$ was heated to 42.5° C. overnight.

The reaction was quenched by adding 16.8 L of 0.5 M HCl while keeping exotherm below 50° C. The quenched reaction mixture was allowed to stir for ½ hour, allowed to settle, and then cut with lower acid wash to wash out the LiCl that results from the LiOH that forms from water and excess n-BuLi and subsequent acidification with HCl. 16.8 L of 0.2 M HCl wash was added and then stirred and heated to 50° C. The reaction mixture was allowed to settle and cut with a water layer. 8.2 L of R.O. water was added and then stirred at 50° C. Then the reaction mixture was allowed to settle and cut water layer. The organic layer was sent to a clean reactor through a pall filter and vacuum distilled down to dryness at 35-40° C.

16.9 L of acetone was added and allowed to stir at 55° C. to dissolve. 16.9 L of ethanol was added. 25.4 L of solvent was atmospherically distilled off, and then gradually cooled to 5° C. After maintaining at −5° C. overnight, vacuum filtration provided the pure octamethyl ferrocene buffer, which was then washed with chilled MeOH. This procedure was estimated to provide octamethyl ferrocene buffer in 70-75% yield that is of high purity.

To a 50 L glass-lined still was added 14.7 kg of mono methyl adipic acid and 6.1 kg of acetic anhydride. The reactor was subjected to complete vacuum with stirring and heating to distill off acetic acid. Initial distillation was expected to occur at around 100° C. pot temperature. Most of the reaction was expected to occur at the first 10° C. of temperature increase. The pot temperature was increased by 5° C. increments until distillation slowed. Distillation at a pot temperature above 160° C. was avoided because above this temperature, decomposition gradually occurs. When correct mass of 5.5 kg of acetic acid and 1.4 kg of acetic anhydride was distilled off, the reaction was stopped. The resulting anhydride was provided in about 100% with >90% purity. The anhydride was collected in the next step, which is the Friedel-Crafts acylation Assuming that the yield of octa methyl ferrocene was 75%, the octa methyl ferrocene was subjected to a Friedel-Crafts acylation with methyl adipic anhydride using zinc chloride as the catalyst and toluene as the solvent. 4.61 kg of octamethyl ferrocene was dissolved in 46.1 L of toluene, and to this solution was added 13.9 kg of methyl adipic anhydride. The reaction mixture was stirred and heated to 50-60° C. over ½ hour after which 4.153 g of dry zinc chloride was added to the solution. Since zinc chloride is very hygroscopic, it was important to make sure that the zinc chloride was dry before adding to the reactor. The reaction solution was heated to 85° C. under a nitrogen atmosphere, and the reaction was completed after around 4 hours. Reaction completion was checked with TLC using 8:2 Hexane:EtOAc as eluent, where the $R_f$ of bis keto ester at about 0.2. 30.8 L of 1.0 N hydrochloric acid was added to wash out the zinc chloride at 80° C. This was stirred and heated to 80° C. for 1 hour. The stirrer was shut off, and the solution was allowed to settle for ½ hour. The bottom acid wash layer was cut and discarded, and the top organic layer was added back to the reaction vessel. A dilute acid wash of 15.4 L of M HCl was used followed by heating to 80° C., where the layers were allowed settle over ½ hour. The aqueous layer was then removed from then red organic layer.

To the remaining organic layer was added 20.5 L of R.O. water and 2.1 kg of sodium carbonate hydrate. This mixture was stirred and heated to a gentle reflux under a nitrogen atmosphere to remove remaining anhydride. The mixture was refluxed overnight for 18 hours, and then the red base layer was removed from a red organic layer. The weight of the water layer was around 26.7 kg. To the toluene solution was charged 15.4 L of R.O. water and was then heated to 80° C. The stirrer was stopped, and time was allowed for the layers to separate (about 30 minutes for layer separation). The red water layer was removed from the dark red organic layer. The water layer weighed about 16.4 kg. The red organic layer was concentrated to dryness. The oil was dissolved in 23.0 L of dry THF. The reaction solution was cooled to 0° C., and 49.2 liters of 1.0 M $BH_3$-THF was added over a period of at least 2 hours, keeping the reaction temperature between 0 and 10° C. The reaction solution was then stirred at 0° C. for 4 hours and then gradually heated to 20° C. over 8 hours. The reaction solution was then stirred for at least another 12 hrs at 20° C. or until the reaction was deemed completed by TLC analysis (where there was mono keto ester remaining; 8/2 hexane/EtOAc)).

The reduction was quenched with a slow addition of methanol until the out-gassing stopped (~500 ml). Then water (about 500 mL) was slowly added until the exotherm and effervescence stopped. 7.7 L of 1.0 M HCl was added and stirred, and vacuum distillation was used to remove all of the 77.2 L of THF (68.6 kg). 15.0 L of toluene was then added and then heated to 80° C. The reaction mixture was allowed to settle for at least 15 minutes. The lower water layer was cut and discarded. The toluene layer was washed again with 3.0 L of R.O. water at 70-80° C. The reaction mixture was allowed to settle and the water layer was cut. The hot toluene solution was transferred through a pall filter to another reactor and all of the toluene was distilled off to yield about ~7.6 kg of an tan colored oil. After cooling to <55° C., 7.6 L of acetone was added with stirring and heating to 58° C. to form a homogenous solution. The solution was then cooled and held at room temperature to allow crystallization to occur overnight. Then the solution was further cooled to −5 to −10° C. a second night. Vacuum filtration and acetone washing (twice with 2.0 L of acetone at −5° C.) provided about 5-6 kg of octamethyl di-hexanol ferrocene.

5.0 kg of octa methyl di hexanol ferrocene was dissolved in 40 L of 1,2 dichloro ethane. 2.42 kg of triethyl amine was added and followed by cooling to 0° C. with stirring under a nitrogen atmosphere. 2.65 kg of trimethyl acetyl chloride was added over ½ hour to the ferrocene reaction solution. The reaction was allowed to stirred at 0° C. for at least two hours to form the bis-pivalate ester ferrocene. 20 L of water and 300 g of soda ash was added and allowed to stir for 1 hour while heating to 70° C. The bottom dichloro ethane layer containing product was collected and distilled to an oil. The oil was dissolved in 13.3 L of acetone and 13.3 L of ethanol. 20 L of the solvent was distilled off followed by cooling to 5° C. for at least 24 hours for crystallization. The octa methyl bis pivalate ester ferrocene was collected and washed with pre-chilled ethanol. Around 5 kg of the octa methyl bis(hexano pivalate ester) ferrocene was obtained.

5 kg of octa methyl bis(hexano pivalate ester) ferrocene was charged to a reactor with 20 L of diethyl ether and allowed to stir at room temperature. 405 g of para benzo quinone was added and stirred to dissolve at room temperature. 1.238 kg of hydro fluoro boric acid diethyl ether complex was added over a period of at least 1 hour. The reaction was allowed to continue to stir for at least 1 hour after the addition was completed. Cooling the solution at −10° C. allowed for the crystallization of the tetrafluoroborate salt of the octa methyl bis(hexano pivalate ester) ferrocinium, which was then then filtered off.

Example 2. Electrochromic Device for Use as a Near IR Filter

In this Example, structures of the anodic and cathodic electroactive materials and the buffer are shown below. The anodic electroactive material was a near IR absorbing anodic comprising N-isobutyl bis(dimethyl amino) phenothiazine at 10 mM. The cathodic electroactive material was a soluble colorless cathodic comprising octa methyl bis(hexano pivalate ester) ferrocinium tetrafluoroborate that was prepared in accordance to the above Example 1 at 13.5 mM. The buffer used was octa methyl bis(hexano pivalate ester) ferrocene that was prepared in accordance to the above Example 1 at 1 mM.

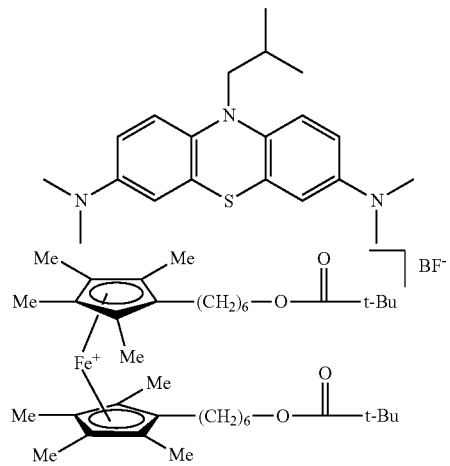

N isobutyl Bis(dimethyl amino) phenothiazine octa methyl bis(hexano pivalate ester) ferrocinium tetrafluoroborate

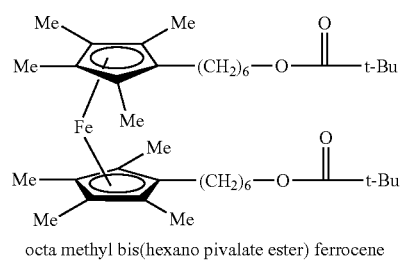

octa methyl bis(hexano pivalate ester) ferrocene

The above ferrocene, ferrocenium, and phenothiazine were dissolved in propylene carbonate at the above concentrations. A 2"×5" window with ½ ITO on 2nd and 3rd surface with epoxy seal and offset substrates to allow for bus clips was vacuum filled. The anodic and cathodic electroactive materials and the buffer were added under vacuum and the fill port was plugged with allowing for oxygen ingress. 0.4 Volts was applied to the part to go from 81% to 57% visible light transmission and 64% to 1.6% transmission at 950 nm and <6% transmission in the range from 900 to 1000 nm.

Figure 2:
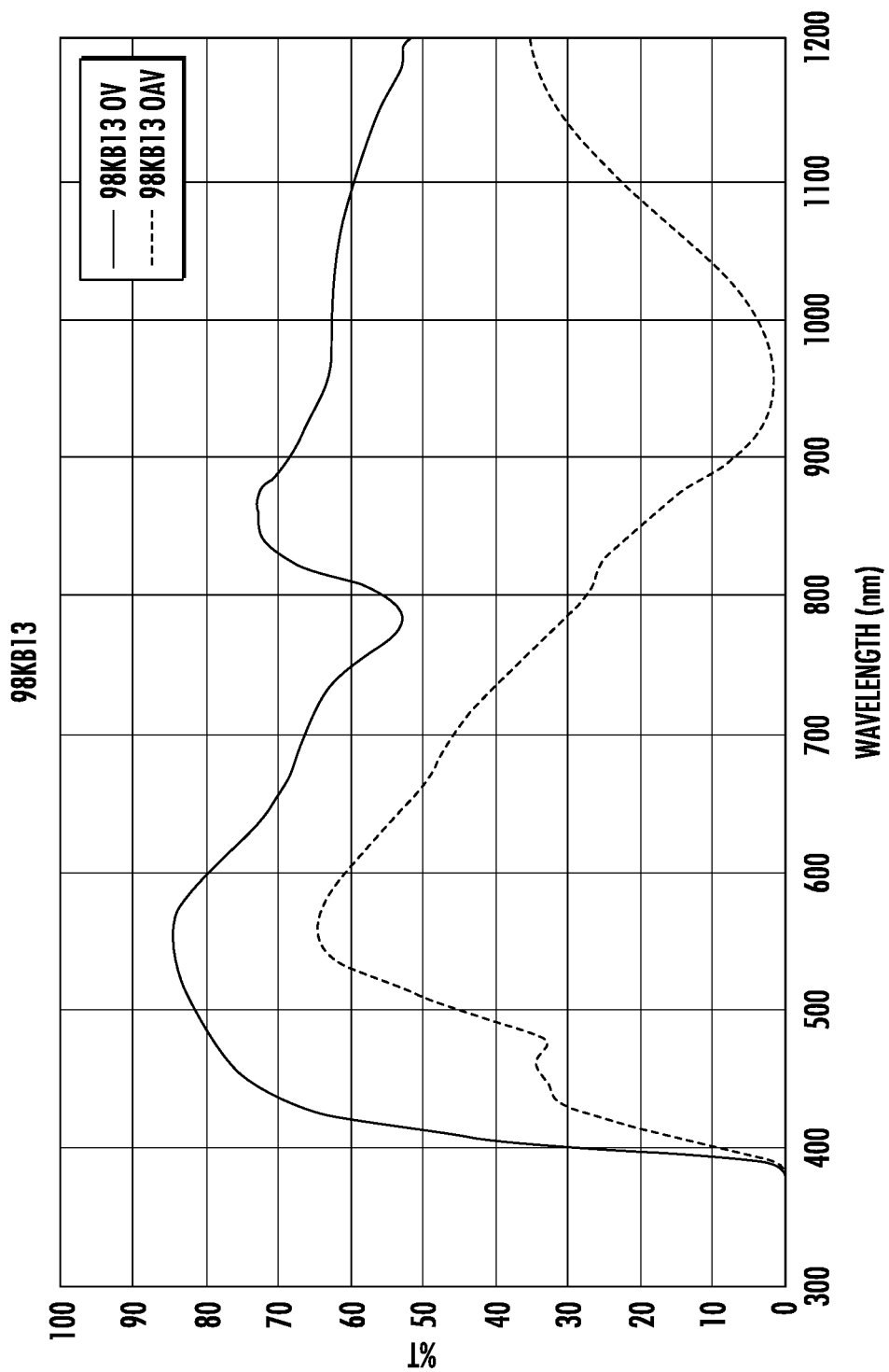
FIG. 2 is a transmission graph from a clear to powered state for a device according to Example 2.
Figure 3:
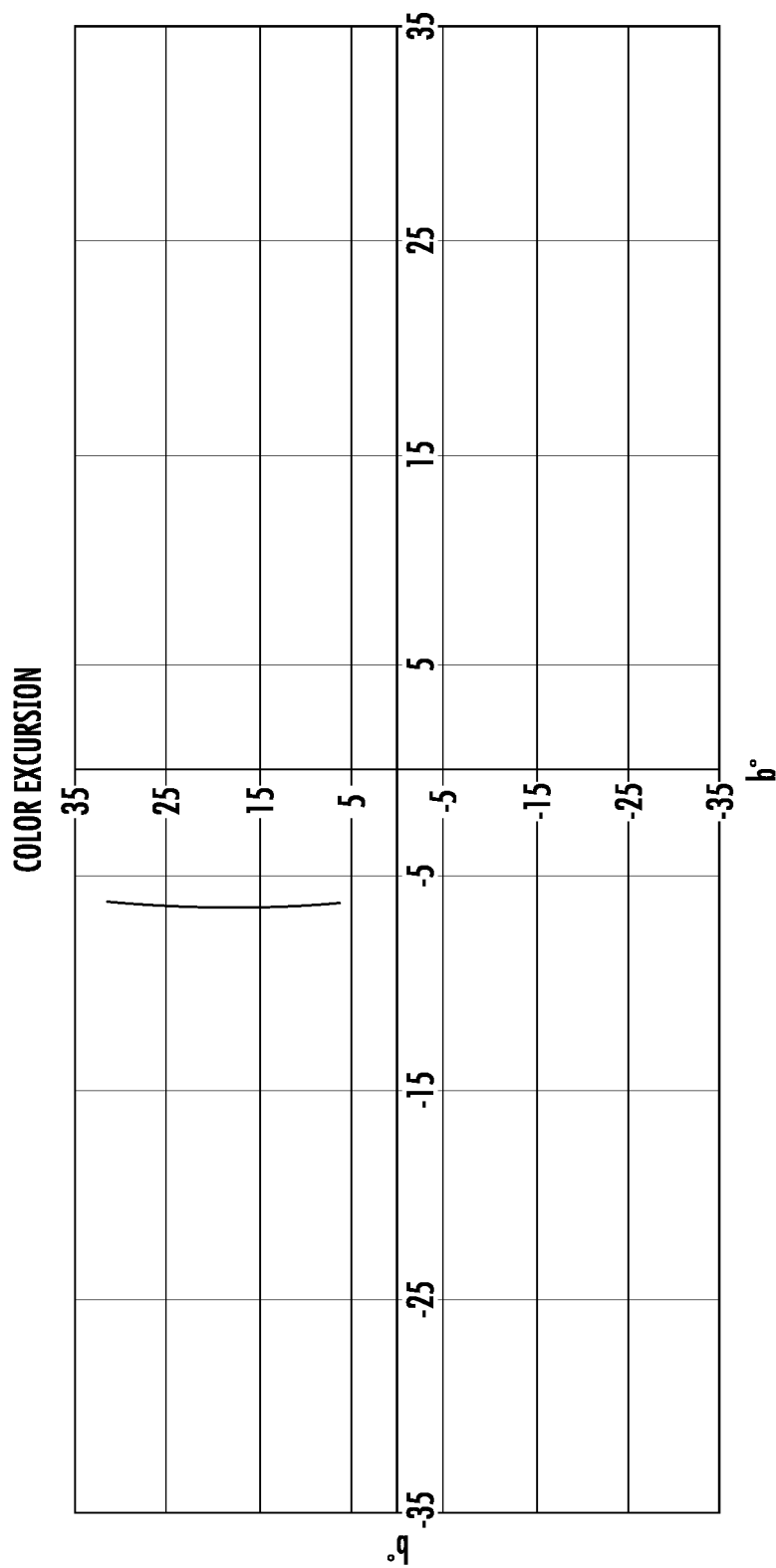
FIG. 3 is a color excursion plot from 0 to 0.6 Volts for a device according to Example 2.
Figure 4:
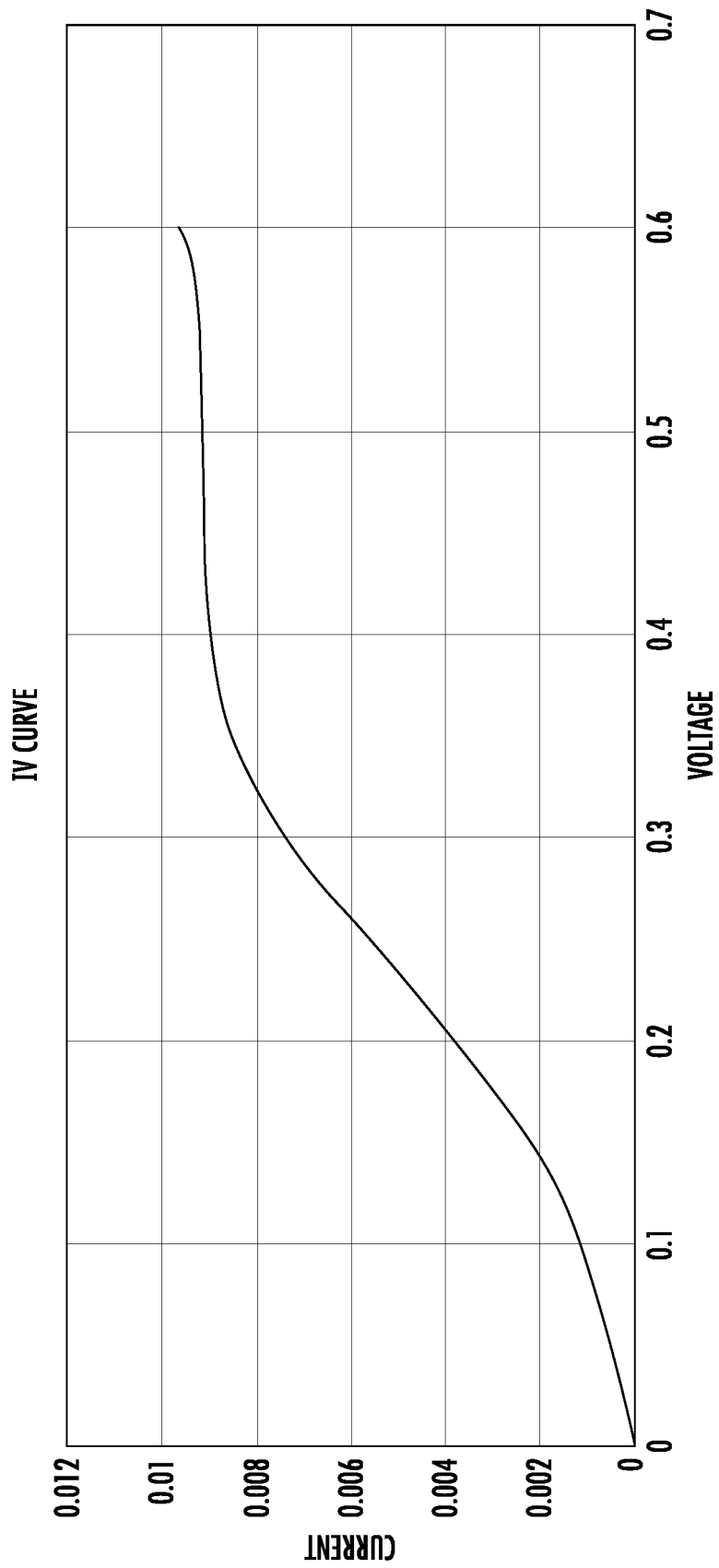
FIG. 4 is an iE curve showing a plateau at 0.4 Volts for a device according to Example 2.
Figure 5:
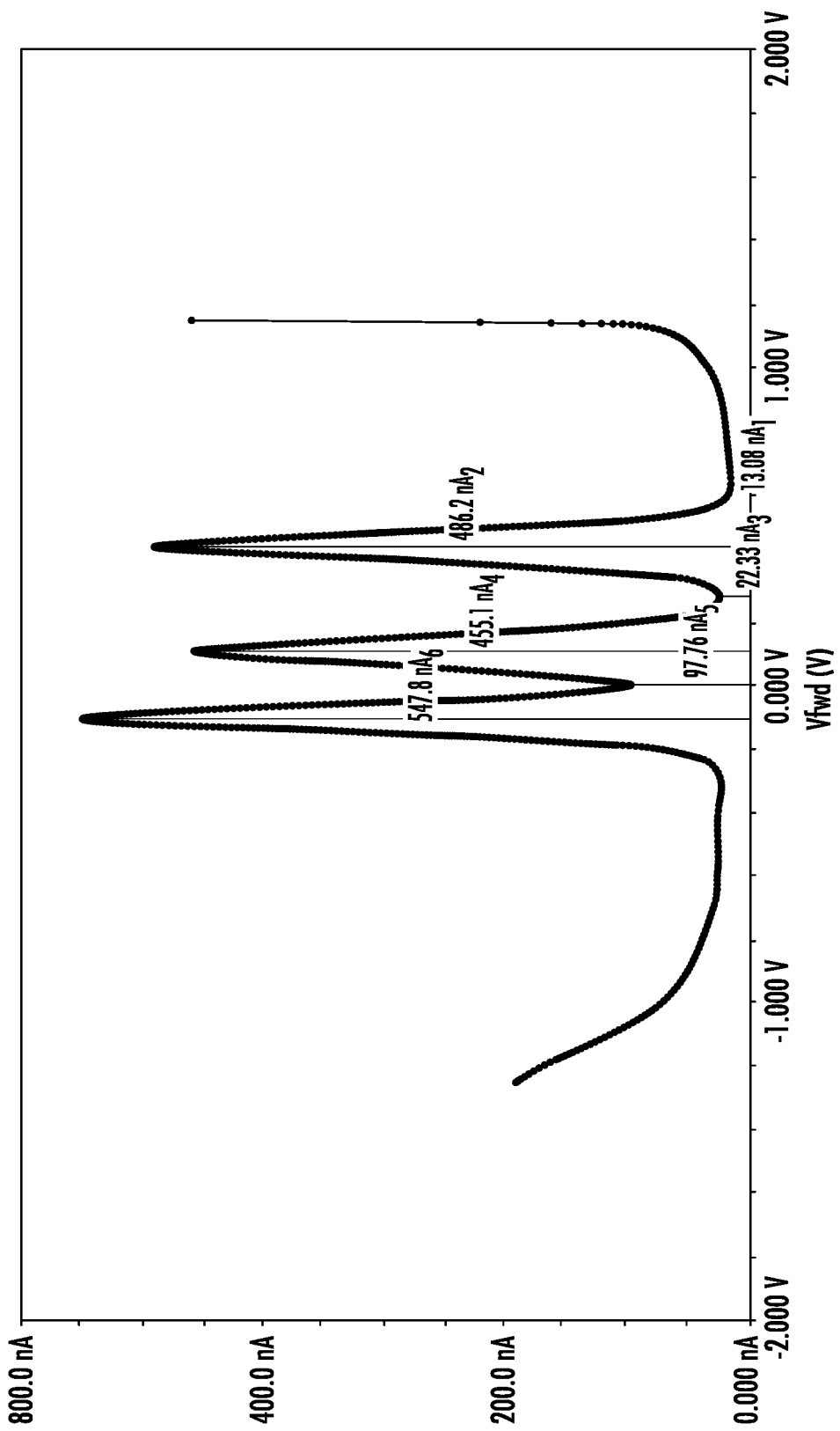
FIG. 5 shows the electrochemistry of the device, where the ferrocene and ferrocenium are combined total one reversible wave, and the anodic is 2 reversible oxidation waves.

The results of Example 2 are summarized in the following figures and table. FIG. 2 shows the transmission in clear and powered state. FIG. 3 shows the color excursion plot from 0 to 0.6 Volts. The below table shows the color and transmission readings at 0 and 0.4 V. FIG. 4 shows that the iE curve plateau at 0.4 Volts. FIG. 5 shows the electrochemistry of the device, where the ferrocene and ferrocenium are combined total one reversible wave, and the anodic is 2 reversible oxidation waves. The transmission measurements from a clear and darkened state show a relatively small loss in transmission in visible light forming a device with a light yellow color. At the same time, much of the near IR light is absorbed between 900 and 1000 nm and especially at 950 nm, which is crucial in certain applications for a near IR filter. In this example, the contrast ratio at 950 nm is 40:1, which is exceptional. This contrast ratio can be increased by increasing the cell spacing of the device or by increasing the concentration of the bis ester octa methyl ferrocenium and the substituted phenothiazine.

| Volt | L | a* | b* | Y | X | Z | u' | v' |
| --- | --- | --- | --- | --- | --- | --- | --- | --- |
| 0 V | 92.29382 | −6.49423 | 6.904234 | 81.36489 | 73.96732 | 77.97702 | 0.193585 | 0.479127 |
| 0.4 V | 80.233 | −5.77592 | 28.37133 | 57.095 | 51.90212 | 34.90518 | 0.204936 | 0.507239 |

Example 3. Another Electrochromic Device for Use as a Near IR Filter

In this Example, the anodic and cathodic electroactive materials and the buffer were the same as those used in the Example 2. The anodic electroactive material was a near IR absorbing anodic comprising N-isobutyl bis(dimethyl amino) phenothiazine at 10 mM. The cathodic electroactive material was a soluble colorless cathodic comprising octa methyl bis(hexano pivalate ester) ferrocinium tetrafluoroborate that was prepared in accordance to the above Example 1 at 13 mM. The buffer used was octa methyl bis(hexano pivalate ester) ferrocene that was prepared in accordance to the above Example 1 at 0.5 mM.

The above ferrocene, ferrocenium, and phenothiazine compounds were dissolved in propylene carbonate at the above concentrations. A 2"×5" window with ½ ITO on 2nd and 3rd surface with epoxy seal and offset substrates to allow for bus clips was vacuum filled. The anodic and cathodic electroactive materials and the buffer were added under vacuum and the fill port was plugged with allowing for oxygen ingress. 0.4 Volts was applied to the part at 200 micron cell spacing provided a range of >67% transmission at 940 nm in the clear state to <1% transmission at 940 nm.

Figure 6:
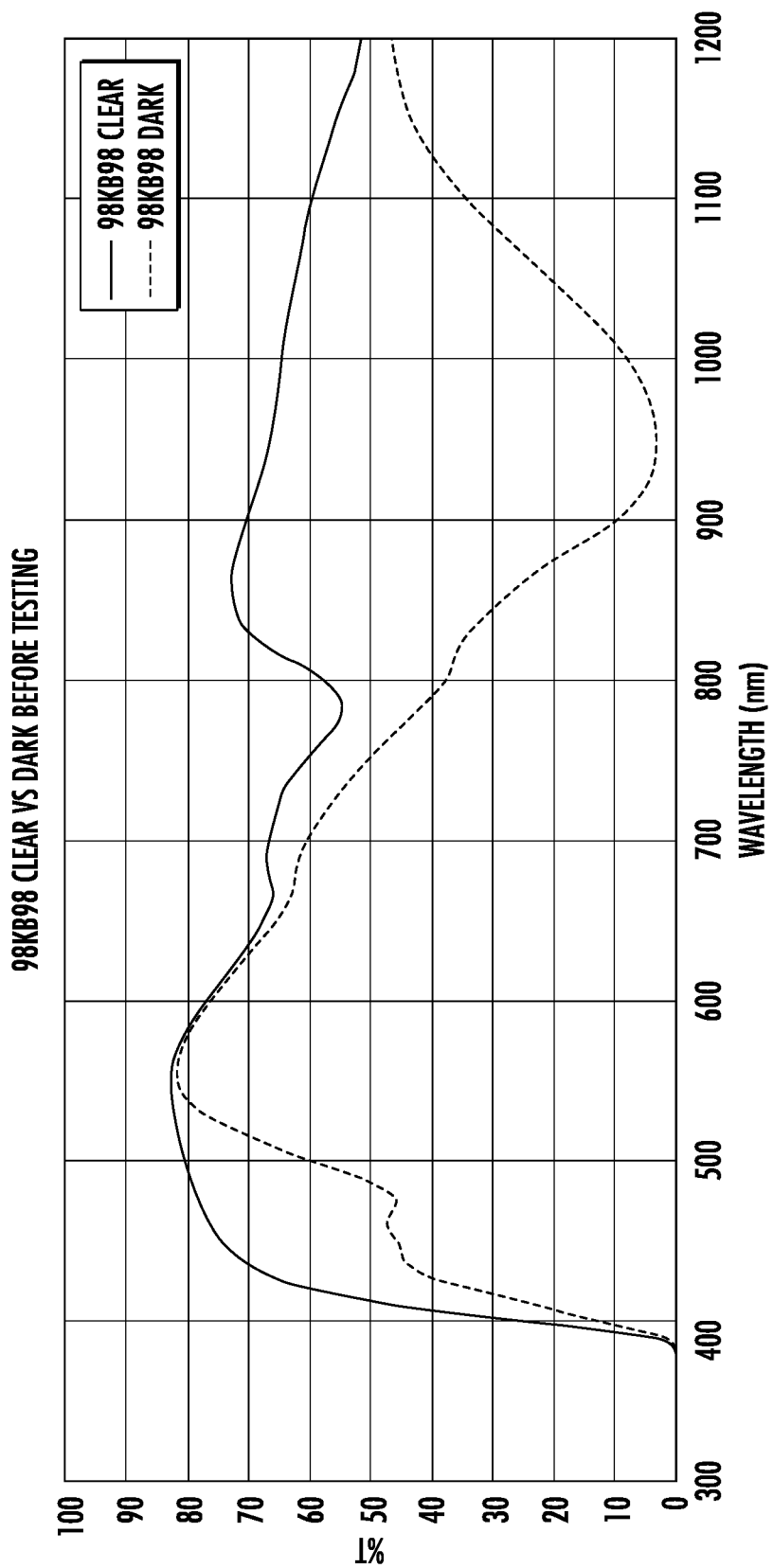
FIG. 6 shows the clear and dark transmission at time 0 for a device according to Example 3.
Figure 7:
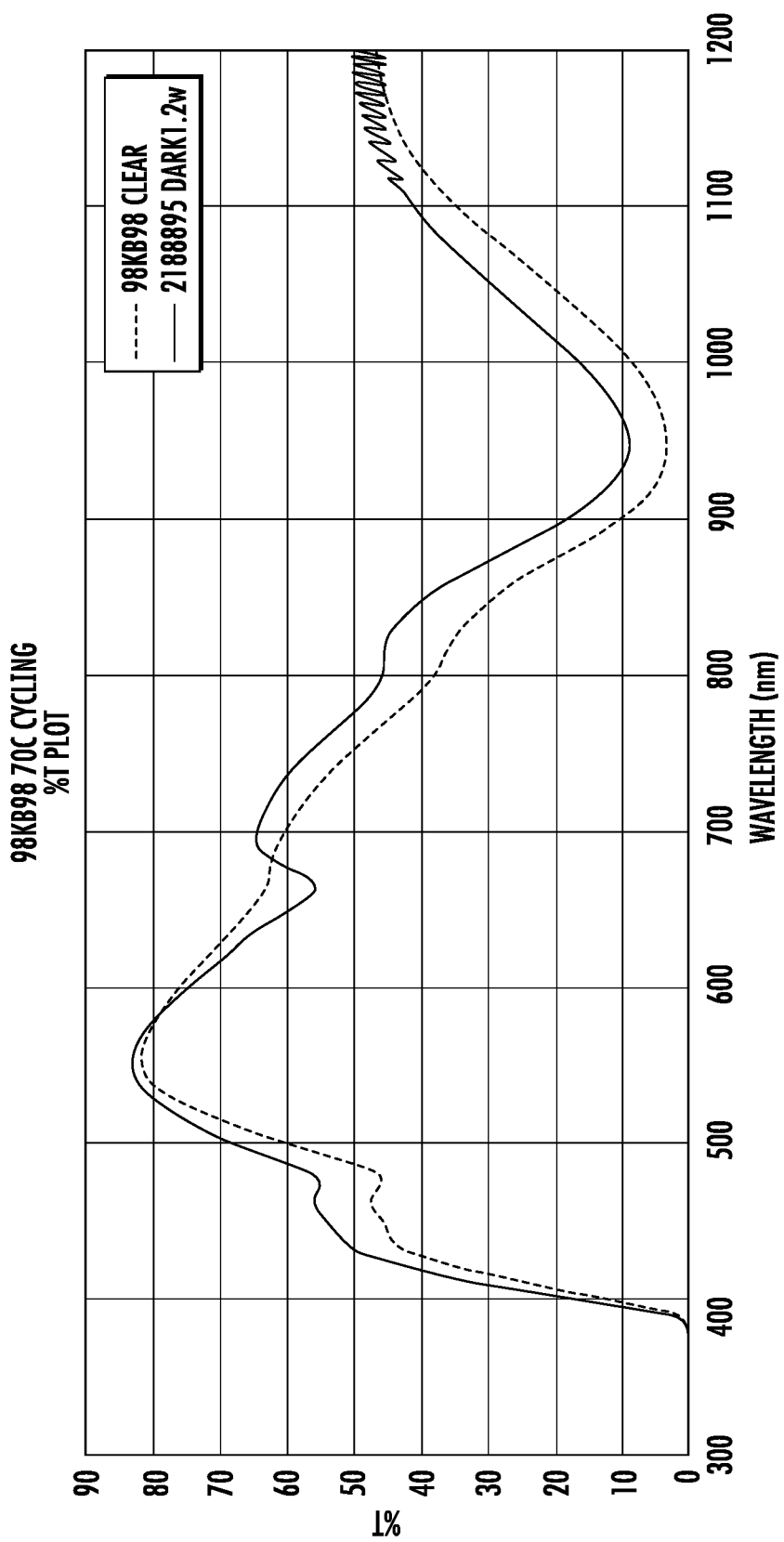
FIG. 7 shows the transmission over 2000 hours in 70° C. cycling for a device according to Example 3.
Figure 8:
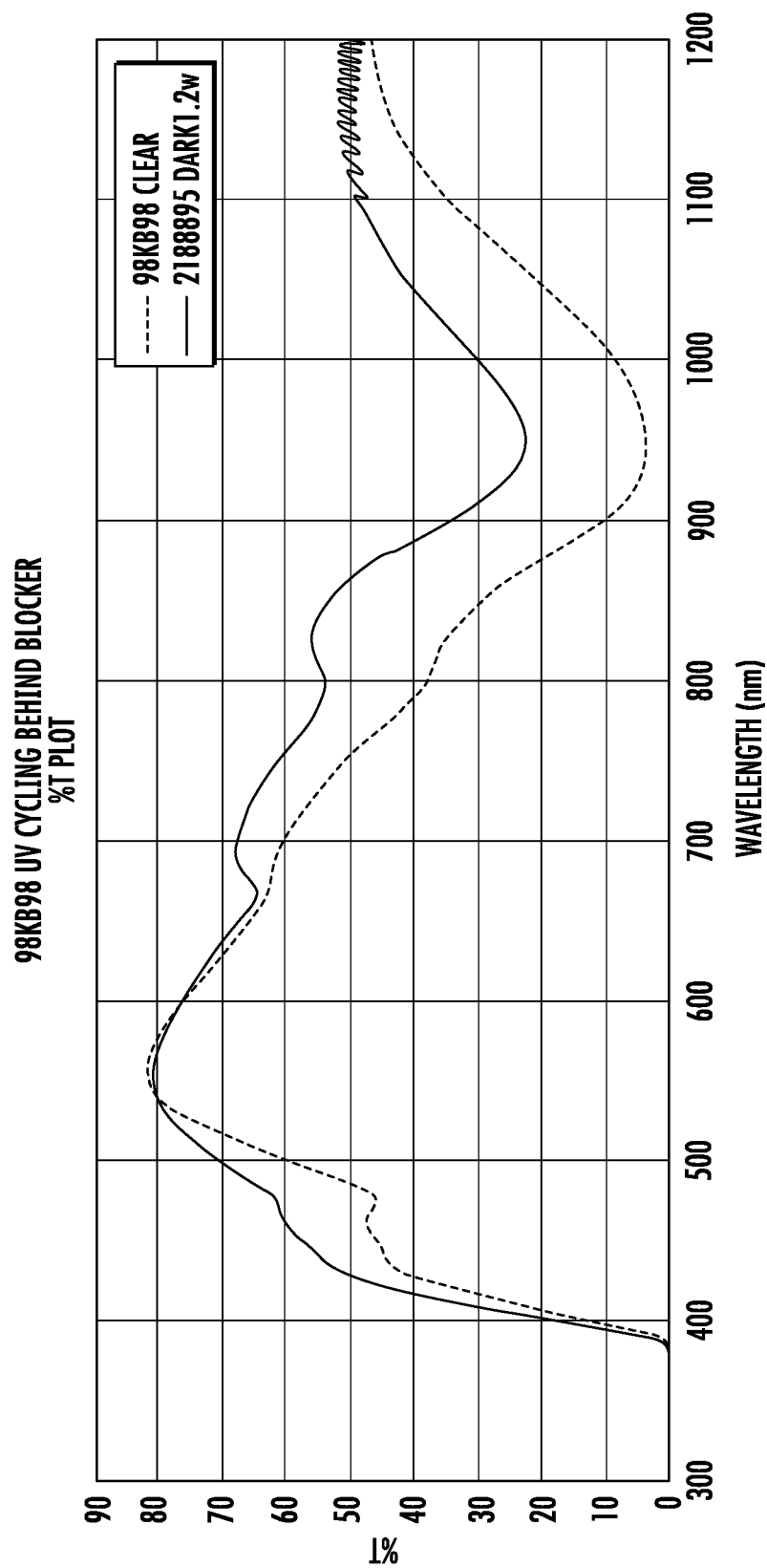
FIG. 8 shows the transmission over 2000 hours of long duty UV cycling for a device according to Example 3.

The results of Example 3 are summarized in the following figures and table. FIG. 6 shows the clear and dark transmission at time 0. FIG. 7 shows the transmission over 2000 hours in 70° C. cycling. FIG. 8 shows the transmission over 2000 hours of long duty UV cycling. The below table summarizes the total color change after 2000 hours of durability testing.

| Durability Testing Conditions | Color Change (delta E) |
| --- | --- |
| 3 hour on 1 hour off UV Cycling | color change of 7 |
| 2 min on 2 min off UV Cycling | color change of 7 |
| 70° C. 2 min cycling | color change of 3 |
| 70° C. storage | color change of 7 |
| Room Temp cycling | color change of <1 |

Para. 1. A compound represented by the structure of Formula (I), or a salt thereof:

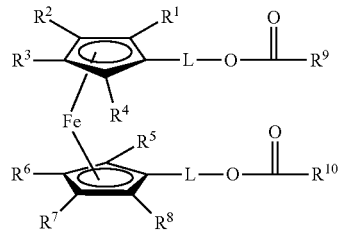

wherein:

$R^1$, $R^2$, $R^3$, $R^4$, $R^5$, $R^6$, $R^7$, and $R^8$ are each independently H or a substituted or unsubstituted $C_1$-$C_{10}$ alkyl group;

each L is independently a substituted or unsubstituted $C_1$-$C_{20}$ alkylene group; and $R^9$ and $R^{10}$ are each independently substituted or unsubstituted $C_1$-$C_{20}$ alkyl group, substituted or unsubstituted $C_2$-$C_{20}$ alkenyl group, substituted or unsubstituted $C_2$-$C_{20}$ alkynyl group, substituted or unsubstituted $C_3$-$C_{10}$ cycloalkyl group, substituted or unsubstituted aryl group, and substituted or unsubstituted heteroaryl group.

Para. 2. The compound of Para. 1, wherein $R^1$, $R^2$, $R^3$, $R^4$, $R^5$, $R^6$, $R^7$, and $R^8$ are each independently H.

Para. 3. The compound of Para. 1, wherein $R^1$, $R^2$, $R^3$, $R^4$, $R^5$, $R^6$, $R^7$, and $R^8$ are each independently substituted or unsubstituted $C_1$-$C_{10}$ alkyl group.

Para. 4. The compound of Para. 3, wherein $R^1$, $R^2$, $R^3$, $R^4$, $R^5$, $R^6$, $R^7$, and $R^8$ are each independently substituted or unsubstituted $C_1$-$C_8$ alkyl group, substituted or unsubstituted $C_1$-$C_6$ alkyl group, or unsubstituted $C_1$-$C_4$ alkyl group.

Para. 5. The compound of Para. 3, wherein $R^1$, $R^2$, $R^3$, $R^4$, $R^5$, $R^6$, $R^7$, and $R^8$ are each independently methyl, ethyl, propyl, butyl, pentyl, hexyl, heptyl, octyl, nonyl, or decyl.

Para. 6. The compound of any one of Paras. 1-5, wherein each L is independently a substituted or unsubstituted $C_1$-$C_{20}$ alkylene group, substituted or unsubstituted $C_1$-$C_{15}$ alkylene group, substituted or unsubstituted $C_1$-$C_{12}$ alkylene group, substituted or unsubstituted $C_1$-$C_{10}$ alkylene group, substituted or unsubstituted $C_1$-$C_8$ alkylene group, substituted or unsubstituted $C_1$-$C_6$ alkylene group, or substituted or unsubstituted $C_1$-$C_4$ alkylene group.

Para. 7. The compound of Para. 6, wherein each L is independently methylene, ethylene, propylene, butylene, pentylene, hexylene, heptylene, octylene, nonylene, or decylene.

Para. 8. The compound of any one of Paras. 1-7, wherein $R^9$ and $R^{10}$ are each independently substituted or unsubstituted $C_1$-$C_{20}$ alkyl group, substituted or unsubstituted $C_2$-$C_{20}$ alkenyl group, substituted or unsubstituted $C_2$-$C_{20}$ alkynyl group, or substituted or unsubstituted $C_3$-$C_{10}$ cycloalkyl group.

Para. 9. The compound of Para. 8, wherein $R^9$ and $R^{10}$ are each independently a substituted or unsubstituted $C_1$-$C_{20}$ alkyl group, substituted or unsubstituted $C_1$-$C_{15}$ alkyl group, substituted or unsubstituted $C_1$-$C_{12}$ alkyl group, substituted or unsubstituted $C_1$-$C_{10}$ alkyl group, substituted or unsubstituted $C_1$-$C_8$ alkyl group, substituted or unsubstituted $C_1$-$C_6$ alkyl group, or substituted or unsubstituted $C_1$-$C_4$ alkyl group.

Para. 10. The compound of Para. 9, wherein $R^9$ and $R^{10}$ are each independently methyl, ethyl, propyl, isopropyl, butyl, isobutyl, sec-butyl, tertiary butyl, pentyl, neopentyl, hexyl, heptyl, octyl nonyl, or decylene.

Para. 11. The compound of Para. 8, wherein $R^9$ and $R^{10}$ are each independently a substituted or unsubstituted $C_2$-$C_{20}$ alkylenyl group, substituted or unsubstituted $C_2$-$C_{15}$ alkenyl group, substituted or unsubstituted $C_2$-$C_{12}$ alkenyl group, substituted or unsubstituted $C_2$-$C_{10}$ alkenyl group, substituted or unsubstituted $C_2$-$C_8$ alkenyl group, substituted or unsubstituted $C_2$-$C_6$ alkenyl group, or substituted or unsubstituted $C_2$-$C_4$ alkenyl group.

Para. 12. The compound of Para. 8, wherein $R^9$ and $R^{10}$ are each independently a substituted or unsubstituted $C_2$-$C_{20}$ alkynyl group, substituted or unsubstituted $C_2$-$C_{15}$ alkynyl group, substituted or unsubstituted $C_2$-$C_{12}$ alkynyl group, substituted or unsubstituted $C_2$-$C_{10}$ alkynyl group, substituted or unsubstituted $C_2$-$C_8$ alkynyl group, substituted or unsubstituted $C_2$-$C_6$ alkynyl group, or substituted or unsubstituted $C_2$-$C_4$ alkynyl group.

Para. 13. The compound of Para. 8, wherein $R^9$ and $R^{10}$ are each independently a substituted or unsubstituted $C_3$-$C_8$ cycloalkyl group or substituted or unsubstituted $C_3$-$C_6$ cycloalkyl group.

Para. 14. The compound of any one of Paras. 1-7, wherein $R^9$ and $R^{10}$ are each independently substituted or unsubstituted aryl group, and substituted or unsubstituted heteroaryl group.

Para. 15. The compound of Para. 13, wherein $R^9$ and $R^{10}$ are each independently substituted or unsubstituted aryl group.

Para. 16. The compound of Para. 13, wherein $R^9$ and $R^{10}$ are each independently substituted or unsubstituted heteroaryl group.

Para. 17. The compound of any one of Paras. 1-16, wherein the compound is a ferrocenium salt with an anion comprising $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, wherein Ar is an aryl or fluorinated aryl group.

Para. 18. The compound of Para. 17, wherein the anion is selected from $BF_4^-$.

Para. 19. The compound of Para. 1, wherein the compound is:

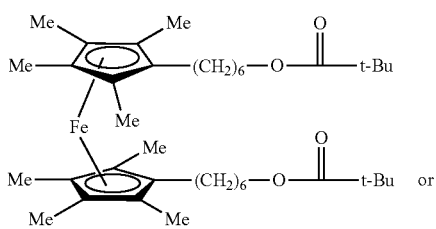

-continued

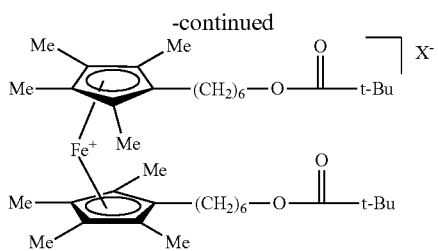

wherein $X^-$ is an anion.

Para. 20. The compound of Para. 19, wherein $X^-$ is $F^-$, $Cl^-$, $I^-$, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, wherein Ar is an aryl or fluorinated aryl group.

Para. 21. An electrochromic device, comprising: (i) at least one solvent; (ii) a cathodic electroactive material; (iii) an anodic electroactive material; and (iv) a buffer comprising the compound of any one of Paras. 1-20.

Para. 22. The electrochromic device of Para. 21, wherein the at least one solvent comprises 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaro nitrile, ketones including 2-acetylbutyrolactone, cyclopentanone, cyclic esters including beta-propiolactone, gamma-butyrolactone, gamma-valerolactone, propylene carbonate, ethylene carbonate, and homogenous mixtures of the same.

Para. 23. The electrochromic device of Para. 21 or Para. 22, wherein the concentration of at least one of the cathodic and anodic electrochromic materials ranges from about 1 mM to about 200 mM, from about 1 mM to about 100 mM, from about 5 mM to about 200 mM, or from about 5 mM to about 100 mM.

Para. 24. The electrochromic device of any one of Paras. 21-23, wherein the concentration of the buffer is from about 0.1 mM to about 200 mM, from about 0.1 mM to about 200 mM, from about 0.1 mM to about 100 mM, from about 0.1 mM to about 50 mM, from about 0.1 mM to about 30 mM, from about 0.1 mM to about 20 mM, from about 1 mM to about 200 mM, from about 1 mM to about 100 mM, from about 1 mM to about 50 mM, from about 1 mM to about 30 mM, or from about 1 mM to about 20 mM.

Para. 25. The electrochromic device of Para. 24, wherein the concentration of the buffer is from 0.1 mM to about 30 mM or from about 1 mM to about 30 mM.

Para. 26. The electrochromic device of any one of Paras. 21-25, wherein the buffer prolongs the thermal stability of the electrochromic device.

Para. 27. The electrochromic device of any one of Paras. 21-26, wherein the buffer prolongs the UV stability of the electrochromic device.

Para. 28. The electrochromic device of any one of Paras. 21-27, wherein the anodic electroactive material comprises a reduced form of methylene blue or an N-alkylated derivative of methylene blue.

Para. 29. The electrochromic device of any one of Paras. 21-28, wherein the anodic electroactive material comprises a compound represented by the structure of Formula (II):

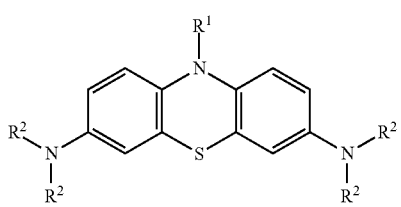

wherein:
R¹ is H or a substituted or unsubstituted $C_1$-$C_{20}$ alkyl group, and
each R² is independently a substituted or unsubstituted $C_1$-$C_{20}$ alkyl group.

Para. 30. The electrochromic device of Para. 29, wherein R¹ is H.

Para. 31. The electrochromic device of Para. 29, wherein R¹ is a substituted or unsubstituted $C_1$-$C_{20}$ alkyl group, substituted or unsubstituted $C_1$-$C_{15}$ alkyl group, substituted or unsubstituted $C_1$-$C_{12}$ alkyl group, substituted or unsubstituted $C_1$-$C_{10}$ alkyl group, substituted or unsubstituted $C_1$-$C_8$ alkyl group, substituted or unsubstituted $C_1$-$C_6$ alkyl group, or substituted or unsubstituted $C_1$-$C_4$ alkyl group.

Para. 32. The electrochromic device of any one of Paras. 29-31, wherein R¹ is H, isobutyl, 2-methyl butyl, 2-ethyl butyl, 2-ethyl hexyl, sec-butyl, isopentyl, or neopentyl.

Para. 33. The electrochromic device of any one of Paras. 29-32, wherein R¹ is H, isobutyl, 2-methylbutyl, 2-ethylbutyl, 2-ethylhexyl, or neopentyl, and each R² is independently methyl.

Para. 34. The electrochromic device of Para. 21, wherein the electrochromic device is a near IR filter and the anodic electroactive material comprises (i) a reduced form of methylene blue or an N-alkylated derivative of methylene blue or comprises a compound represented by the structure of Formula (II):

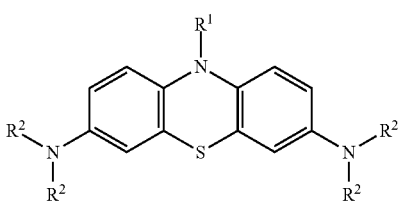

wherein:
R¹ is H or a substituted or unsubstituted $C_1$-$C_{20}$ alkyl group, and
each R² is independently a substituted or unsubstituted $C_1$-$C_{20}$ alkyl group.

Para. 35. The electrochromic device of Para. 34, wherein the electrochromic device is a near IR filter that absorbs within the range of from about 900 to about 1000 nm.

Para. 36. The electrochromic device of Para. 34, wherein the electrochromic device is a near IR filter that absorbs at about 940 nm.

Para. 37. An electrochromic medium for use in an electrochromic device, the medium comprising: (i) at least one solvent; (ii) a cathodic electroactive material; (iii) an anodic electroactive material; and (iv) a buffer comprising the compound of any one of Paras. 1-20.

Para. 38. The electrochromic medium of Para. 37, wherein the anodic electroactive material comprises a reduced form of methylene blue or an N-alkylated derivative of methylene blue.

Para. 39. The electrochromic medium of Para. 38 or 39, wherein the anodic electroactive material comprises a compound represented by the structure of Formula (II):

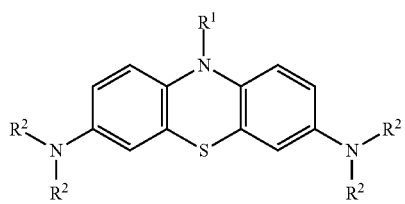

wherein:
R¹ is H or a substituted or unsubstituted $C_1$-$C_{20}$ alkyl group, and
each R² is independently a substituted or unsubstituted $C_1$-$C_{20}$ alkyl group.

Para. 40. The electrochromic medium of Para. 39, wherein R¹ is H.

Para. 41. The electrochromic medium of Para. 39, wherein R¹ is a substituted or unsubstituted $C_1$-$C_{20}$ alkyl group, substituted or unsubstituted $C_1$-$C_{15}$ alkyl group, substituted or unsubstituted $C_1$-$C_{12}$ alkyl group, substituted or unsubstituted $C_1$-$C_{10}$ alkyl group, substituted or unsubstituted $C_1$-$C_8$ alkyl group, substituted or unsubstituted $C_1$-$C_6$ alkyl group, or substituted or unsubstituted $C_1$-$C_4$ alkyl group.

Para. 42. The electrochromic medium of any one of Paras. 39-41, wherein R¹ is H, isobutyl, 2-methyl butyl, 2-ethyl butyl, 2-ethyl hexyl, sec-butyl, isopentyl, or neopentyl.

Para. 43. The electrochromic medium of any one of Paras. 39-42, wherein R¹ is H, isobutyl, 2-methylbutyl, 2-ethylbutyl, 2-ethylhexyl, or neopentyl, and each R² is independently methyl.

Para. 44. A process for preparing a compound represented by the structure of Formula (I):

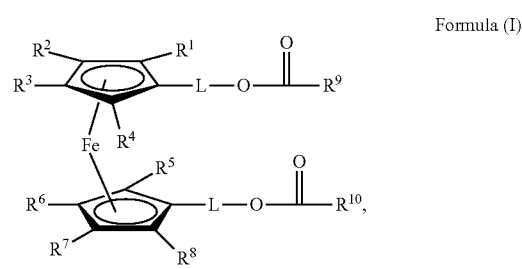

Formula (I)

the process comprising:
(i) contacting a compound represented by the structure of Formula (Ia):

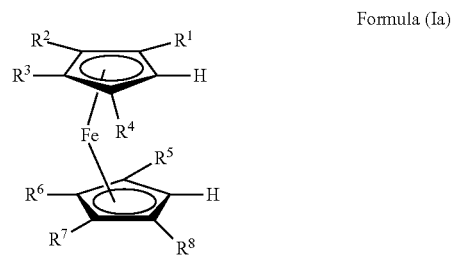

Formula (Ia)

with a compound having a structure of Formula (Ib):

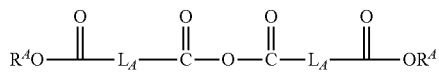
Formula (Ia)

in the presence of zinc dichloride and a solvent to provide a compound having the structure of Formula (Ic):

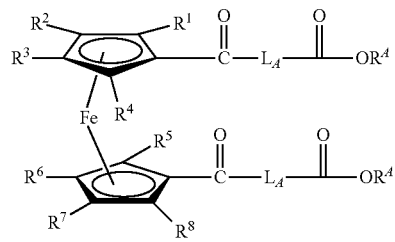
Formula (Ic)

(ii) contacting a compound represented by the structure of Formula (Ic):

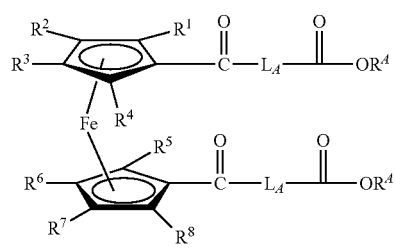
Formula (Ic)

in the presence of a borane complex and a solvent to provide a compound having the structure of Formula (Id):

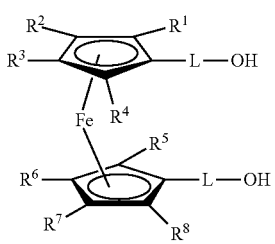

(iii) contacting a compound represented by the structure of Formula (Id):

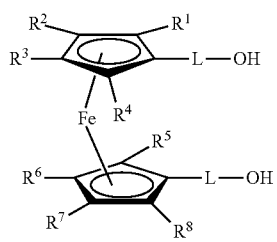
Formula (Id)

with a compound having a structure of Formula (Ie): X¹—C(O)R$^B$, in the presence of a base and a solvent to provide a compound having the structure of Formula I:

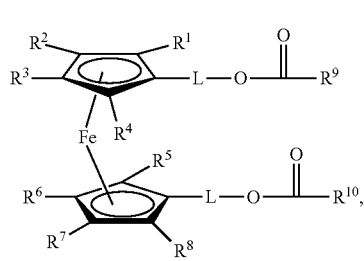
Formula (I)

wherein:
X¹ is a halide;
R$^A$ are each independently a substituted or unsubstituted $C_1$-$C_{10}$ alkyl group;
R¹, R², R³, R⁴, R⁵, R⁶, R⁷, and R⁸ are each independently H or a substituted or unsubstituted $C_1$-$C_{10}$ alkyl group;
each $L_A$ is independently a substituted or unsubstituted $C_1$-$C_{20}$ alkylene group;
each L is independently a substituted or unsubstituted $C_1$-$C_{20}$ alkylene group; and
R⁹ and R¹⁰ are each independently substituted or unsubstituted $C_1$-$C_{20}$ alkyl group, substituted or unsubstituted $C_2$-$C_{20}$ alkenyl group, substituted or unsubstituted $C_2$-$C_{20}$ alkynyl group, substituted or unsubstituted $C_3$-$C_{10}$ cycloalkyl group, substituted or unsubstituted aryl group, and substituted or unsubstituted heteroaryl group; and
wherein R$^B$ in Formula (Ie) corresponds to R⁹ and R¹⁰ in Formula (I).

Para. 45. The process of Para. 44, wherein in step (i), the solvent comprises toluene.

Para. 46. The process of Para. 45, wherein in step (ii), the borane complex comprises BH₃/THF; and the solvent comprises toluene.

Para. 47. The process of any one of Paras. 44-46, wherein in step (iii), X¹ is a chloro group; the base comprises triethylamine; and the solvent comprises dichloroethane.

Para. 48. The process of any one of Paras. 44-47, wherein the compound of Formula (I) is further contacted with a tetrafluoroboric acid complex and benzoquinone to form a ferrocinium compound based upon Formula (I).

Para. 49. The electrochromic device of any one of Paras. 21-36, wherein the cathodic electroactive material and the buffer are the same compound.

Para. 50. The electrochromic medium of any one of Paras. 37-43, wherein the cathodic electroactive material and the buffer are the same compound.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A compound represented by the structure of Formula (I), or a salt thereof:

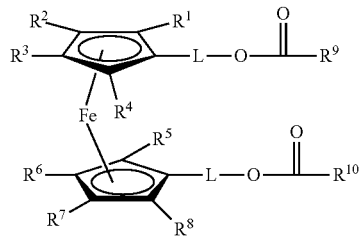

wherein:
R$^1$, R$^2$, R$^3$, R$^4$, R$^5$, R$^6$, R$^7$, and R$^8$ are each independently a substituted or unsubstituted C$_1$-C$_{10}$ alkyl group;
each L is independently a substituted or unsubstituted C$_1$-C$_{20}$ alkylene group; and
R$^9$ and R$^{10}$ are each independently substituted or unsubstituted C$_1$-C$_{20}$ alkyl group, substituted or unsubstituted C$_2$-C$_{20}$ alkenyl group, substituted or unsubstituted C$_2$-C$_{20}$ alkynyl group, substituted or unsubstituted C$_3$-C$_{10}$ cycloalkyl group, substituted or unsubstituted aryl group, and substituted or unsubstituted heteroaryl group.

2. The compound of claim 1, wherein each L is independently a substituted or unsubstituted C$_1$-C$_{20}$ alkylene group, substituted or unsubstituted C$_1$-C$_{15}$ alkylene group, substituted or unsubstituted C$_1$-C$_{12}$ alkylene group, substituted or unsubstituted C$_1$-C$_{10}$ alkylene group, substituted or unsubstituted C$_1$-C$_8$ alkylene group, substituted or unsubstituted C$_1$-C$_6$ alkylene group, or substituted or unsubstituted C$_1$-C$_4$ alkylene group.

3. The compound of claim 2, wherein each L is independently methylene, ethylene, propylene, butylene, pentylene, hexylene, heptylene, octylene, nonylene, or decylene.

4. The compound of claim 1, wherein R$^9$ and R$^{10}$ are each independently substituted or unsubstituted C$_1$-C$_{20}$ alkyl group, substituted or unsubstituted C$_2$-C$_{20}$ alkenyl group, substituted or unsubstituted C$_2$-C$_{20}$ alkynyl group, or substituted or unsubstituted C$_3$-C$_{10}$ cycloalkyl group.

5. The compound of claim 1, wherein the compound is a ferrocenium salt with an anion comprising F$^-$, Cl$^-$, Br$^-$, I$^-$, BF$_4^-$, PF$_6^-$, SbF$_6^-$, AsF$_6^-$, ClO$_4^-$, SO$_3$CF$_3^-$, N(CF$_3$SO$_2$)$_2^-$, C(CF$_3$SO$_2$)$_3^-$, N(SO$_2$C$_2$F$_5$)$^-$, Al(OC(CF$_3$)$_3$)$_4^-$, or BAr$_4^-$, wherein Ar is an aryl or fluorinated aryl group.

6. The compound of claim 1, wherein the compound is:

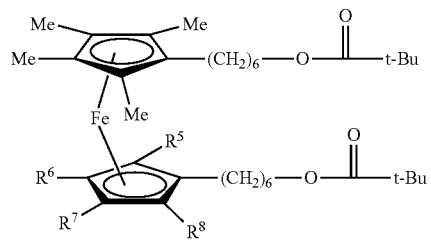

or

-continued

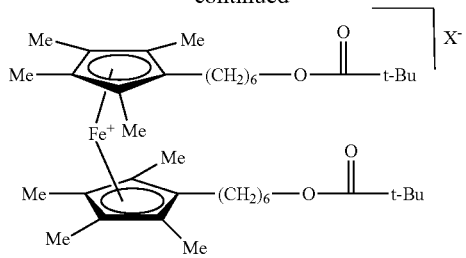

wherein X⁻ is an anion.

7. The compound of claim 6, wherein X⁻ is F⁻, Cl⁻, Br⁻, I⁻, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, wherein Ar is an aryl or fluorinated aryl group.

8. An electrochromic device, comprising: (i) at least one solvent; (ii) a cathodic electroactive material; (iii) an anodic electroactive material; and (iv) a buffer comprising the compound of claim 1.

9. The electrochromic device of claim 8, wherein the at least one solvent comprises 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaro nitrile, ketones including 2-acetyl-butyrolactone, cyclopentanone, cyclic esters including beta-propiolactone, gamma-butyrolactone, gamma-valerolactone, propylene carbonate, ethylene carbonate, and homogenous mixtures of the same.

10. The electrochromic device of claim 8, wherein the concentration of at least one of the cathodic and anodic electrochromic materials ranges from about 1 mM to about 200 mM.

11. The electrochromic device of claim 8, wherein the concentration of the buffer is from about 0.1 mM to about 200 mM.

12. The electrochromic device of claim 11, wherein the concentration of the buffer is from 0.1 mM to about 30 mM or from about 1 mM to about 30 mM.

13. The electrochromic device of claim 8, wherein the anodic electroactive material comprises a reduced form of methylene blue or an N-alkylated derivative of methylene blue.

14. The electrochromic device of claim 8, wherein the anodic electroactive material comprises a compound represented by the structure of Formula (II):

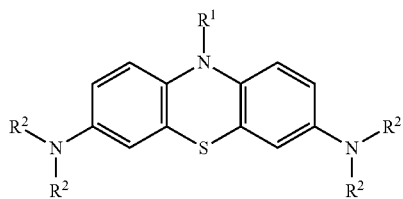

wherein:
$R^1$ is H or a substituted or unsubstituted $C_1$-$C_{20}$ alkyl group, and
each $R^2$ is independently a substituted or unsubstituted $C_1$-$C_{20}$ alkyl group.

15. The electrochromic device of claim 8, wherein the electrochromic device is a near IR filter, and the anodic electroactive material comprises (i) a reduced form of methylene blue or an N-alkylated derivative of methylene blue or comprises a compound represented by the structure of Formula (II):

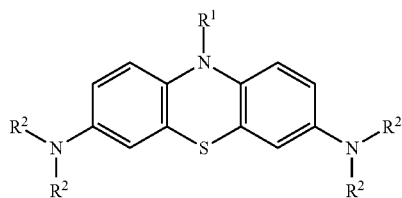

wherein:
$R^1$ is H or a substituted or unsubstituted $C_1$-$C_{20}$ alkyl group, and
each $R^2$ is independently a substituted or unsubstituted $C_1$-$C_{20}$ alkyl group.

16. An electrochromic medium for use in an electrochromic device, the medium comprising: (i) at least one solvent; (ii) a cathodic electroactive material; (iii) an anodic electroactive material; and (iv) a buffer comprising the compound of claim 1.

17. The electrochromic medium of claim 16, wherein the anodic electroactive material comprises a reduced form of methylene blue or an N-alkylated derivative of methylene blue.

18. The electrochromic medium of claim 16, wherein the anodic electroactive material comprises a compound represented by the structure of Formula (II):

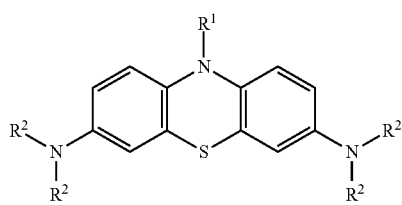

wherein:
$R^1$ is H or a substituted or unsubstituted $C_1$-$C_{20}$ alkyl group, and
each $R^2$ is independently a substituted or unsubstituted $C_1$-$C_{20}$ alkyl group.

* * * * *